United States Patent [19]
Greer et al.

[11] Patent Number: 6,067,762
[45] Date of Patent: *May 30, 2000

[54] INTEGRATED FURNITURE SYSTEM

[75] Inventors: Ernest P. Greer, E. Grand Rapids, Mich.; Robert J. Luchetti, Cambridge, Mass.; David A. Shipman, Grand Rapids; Jack A. Tanis, E. Grand Rapids, both of Mich.; Gregg Robert Draudt, Watertown; Anne C. Ackerly, Cambridge, both of Mass.; Michael Tingley, Portland, Oreg.

[73] Assignee: Steelcase Development Inc., Grand Rapids, Mich.

[*] Notice: This patent is subject to a terminal disclaimer.

[21] Appl. No.: 09/272,043

[22] Filed: Mar. 18, 1999

Related U.S. Application Data

[63] Continuation of application No. 09/092,571, Jun. 5, 1998, which is a continuation-in-part of application No. 08/450,253, May 25, 1995, Pat. No. 5,809,708, which is a division of application No. 08/367,804, Dec. 30, 1994, Pat. No. 5,784,843, said application No. 09/092,571, is a continuation-in-part of application No. 09/067,731, Apr. 28, 1998, which is a continuation of application No. 08/579,614, Dec. 26, 1995, Pat. No. 5,746,035, which is a continuation-in-part of application No. 08/367,802, Dec. 30, 1994, Pat. No. 5,746,034.

[51] Int. Cl.⁷ ........................................................ E04B 2/82
[52] U.S. Cl. ............................................ 52/220.7; 52/239
[58] Field of Search ................................... 52/238.1, 239, 52/220.7, 36.1, 36.4, 36.5

[56] References Cited

U.S. PATENT DOCUMENTS

| | | |
|---|---|---|
| 1,724,821 | 8/1929 | Bohnsack . |
| 1,990,259 | 2/1935 | Walters . |
| 2,121,213 | 6/1938 | Small . |
| 3,045,784 | 7/1962 | Hasekamp . |
| 3,065,575 | 11/1962 | Ray . |
| 3,090,164 | 5/1963 | Nelsson . |
| 3,101,817 | 8/1963 | Radek . |

(List continued on next page.)

FOREIGN PATENT DOCUMENTS

| | | |
|---|---|---|
| 581818 | 3/1989 | Australia . |
| 924472 | 4/1973 | Canada . |
| 1055464 | 2/1954 | France . |
| 2508524 | 12/1982 | France . |
| 714002 | 8/1954 | United Kingdom . |
| 1098851 | 1/1968 | United Kingdom . |
| 1600990 | 10/1981 | United Kingdom . |
| 2212186A | 7/1989 | United Kingdom . |

OTHER PUBLICATIONS

Exhibit A is a brochure entitled *Knoll—Hannah Desk System*, 18 pages, dated Oct. 1986.

(List continued on next page.)

*Primary Examiner*—Michael Safavi
*Attorney, Agent, or Firm*—Price Heneveld Cooper Dewitt & Litton

[57] ABSTRACT

An integrated prefabricated furniture system is provided for fitting-out a building space of the type having a generally open plan interior defined by fixed walls. The furniture system includes a wall-covering frame, freestanding partition frames, and floor-to-ceiling frames that can be interconnected to subdivide the building space. The wall-covering frame is constructed to be positioned against and selectively cover portions of the fixed walls, and the portable partition system and the floor-to-ceiling frames are constructed to spatially divide the building space into a plurality of work areas, with at least one of the freestanding partition frames having an end abutted against the wall-covering frame. A plurality of cover panels is removably attached to the wall-covering frame and to the freestanding partition frames for covering the wall-covering frame, the freestanding partition frames, and the floor-to-ceiling frames. The integrated prefabricated furniture system further includes additional systems for completely furnishing a building space, including an overhead framework system, a raised floor system, a column-covering system, a system of pre-assembled facades, an overhead link head system, and a storage wall system.

31 Claims, 24 Drawing Sheets

U.S. PATENT DOCUMENTS

| | | |
|---|---|---|
| 3,135,026 | 6/1964 | Fridolph . |
| 3,180,459 | 4/1965 | Liskey, Jr. . |
| 3,195,698 | 7/1965 | Codrea . |
| 3,290,846 | 12/1966 | Mader et al. . |
| 3,378,977 | 4/1968 | Vervloet . |
| 3,425,568 | 2/1969 | Albright . |
| 3,500,894 | 3/1970 | Pofferi . |
| 3,514,794 | 6/1970 | Pofferi . |
| 3,514,883 | 6/1970 | Albright . |
| 3,561,182 | 2/1971 | Madl, Jr. . |
| 3,686,805 | 8/1972 | Pofferi . |
| 3,721,050 | 3/1973 | Perina . |
| 3,745,732 | 7/1973 | Pritchard et al. . |
| 3,927,498 | 12/1975 | Benedetti . |
| 4,015,397 | 4/1977 | Flachbarth et al. . |
| 4,224,769 | 9/1980 | Ball et al. . |
| 4,255,611 | 3/1981 | Propst et al. . |
| 4,353,411 | 10/1982 | Harter et al. . |
| 4,391,073 | 7/1983 | Mollenkopf et al. . |
| 4,470,232 | 9/1984 | Condevaux et al. . |
| 4,535,577 | 8/1985 | Tenser et al. . |
| 4,571,906 | 2/1986 | Ashton . |
| 4,578,914 | 4/1986 | Staples . |
| 4,619,486 | 10/1986 | Hannah et al. . |
| 4,631,881 | 12/1986 | Charman . |
| 4,646,211 | 2/1987 | Gallant et al. . |
| 4,660,339 | 4/1987 | Paz . |
| 4,685,255 | 8/1987 | Kelley . |
| 4,712,336 | 12/1987 | Backer . |
| 4,771,583 | 9/1988 | Ball et al. . |
| 4,833,848 | 5/1989 | Guerin . |
| 4,841,699 | 6/1989 | Wilson et al. . |
| 4,874,027 | 10/1989 | Boundy et al. . |
| 4,874,322 | 10/1989 | Dola et al. . |
| 4,876,835 | 10/1989 | Kelley et al. . |
| 4,883,330 | 11/1989 | Armstrong et al. . |
| 4,899,509 | 2/1990 | Power . |
| 4,905,428 | 3/1990 | Sykes . |
| 4,918,886 | 4/1990 | Benoit et al. . |
| 4,932,177 | 6/1990 | Hinden . |
| 4,942,805 | 7/1990 | Hellwig et al. . |
| 4,944,122 | 7/1990 | Wendt . |
| 5,025,603 | 6/1991 | Johnson . |
| 5,038,539 | 8/1991 | Kelley et al. . |
| 5,056,285 | 10/1991 | Frascaroli et al. . |
| 5,062,246 | 11/1991 | Sykes . |
| 5,086,597 | 2/1992 | Kelley et al. . |
| 5,094,053 | 3/1992 | Militzer . |
| 5,134,826 | 8/1992 | La Roche et al. . |
| 5,142,832 | 9/1992 | Branham, Sr. et al. . |
| 5,155,955 | 10/1992 | Ball et al. . |
| 5,175,969 | 1/1993 | Knauf et al. . |
| 5,177,917 | 1/1993 | del Castillo Von Haucke . |
| 5,195,286 | 3/1993 | DeLong et al. . |
| 5,203,132 | 4/1993 | Smolik . |
| 5,207,041 | 5/1993 | Wills . |
| 5,209,035 | 5/1993 | Hodges et al. . |
| 5,214,890 | 6/1993 | Levitan et al. . |
| 5,241,796 | 9/1993 | Hellwig et al. . |
| 5,277,005 | 1/1994 | Hellwig et al. . |
| 5,277,007 | 1/1994 | Hellwig et al. . |
| 5,282,341 | 2/1994 | Baloga et al. . |
| 5,287,666 | 2/1994 | Frascaroli et al. . |
| 5,309,686 | 5/1994 | Underwood et al. . |
| 5,341,615 | 8/1994 | Hodges et al. . |
| 5,377,461 | 1/1995 | DeGrada et al. . |
| 5,383,318 | 1/1995 | Kelley et al. . |
| 5,394,658 | 3/1995 | Schreiner et al. . |
| 5,394,668 | 3/1995 | Lim . |
| 5,406,760 | 4/1995 | Edwards . |
| 5,431,210 | 7/1995 | Nelson et al. . |
| 5,452,547 | 9/1995 | Baloga et al. . |

OTHER PUBLICATIONS

Exhibit B is a brochure entitled *Knoll—Hannah Desk System*, 13 pages, undated but published in 1986.

Exhibit C is a publication entitled *Knoll—Hannah Desk System—Electrical Assembly Guide*, (12 pages), undated but published in 1986.

Exhibit D is a publication entitled *Knoll—Hannah Desk System—Assembly Guide*, 12 pages, undated but published in 1986.

Teknion, *Office Furniture Systems*, 11 pages, copyright 1982.

Teknion, *3 Reasons Why Teknion Could Change Your Mind About Office Furniture Systems*, 17 pages, copyright 1983.

Teknion, *Price List Apr. 1983*, 32 pages.

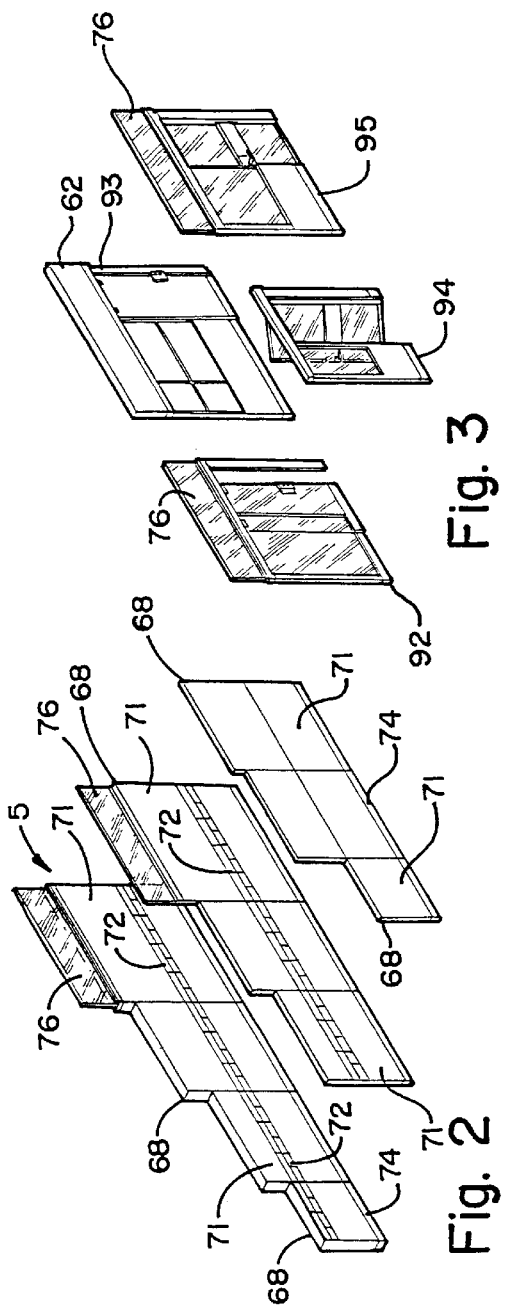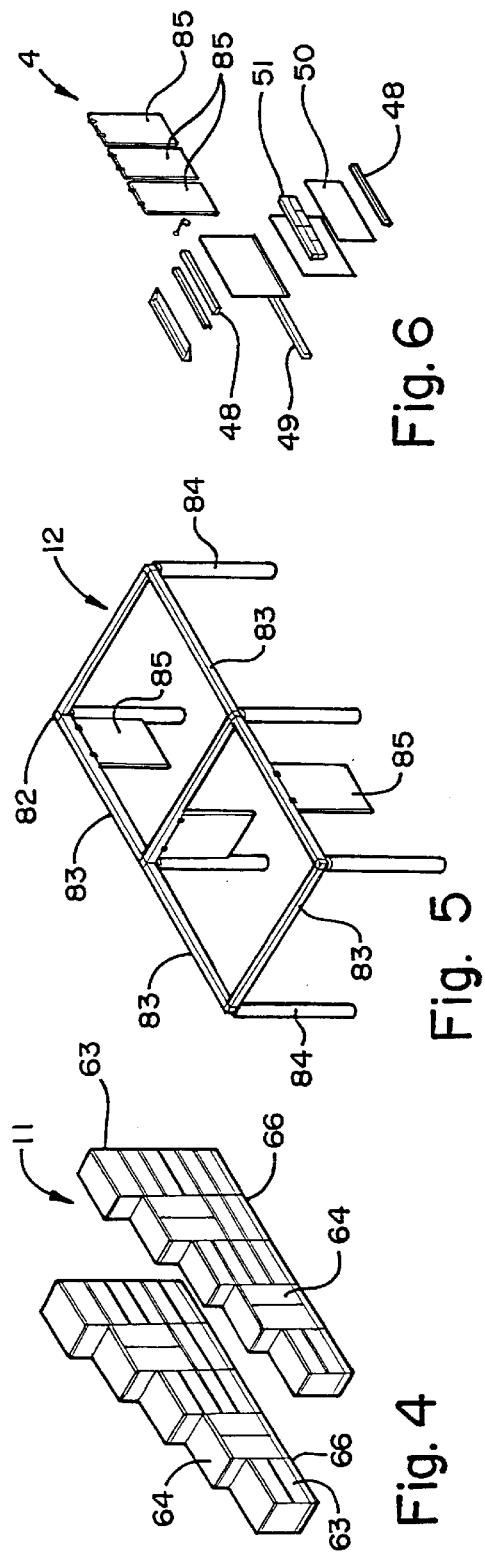

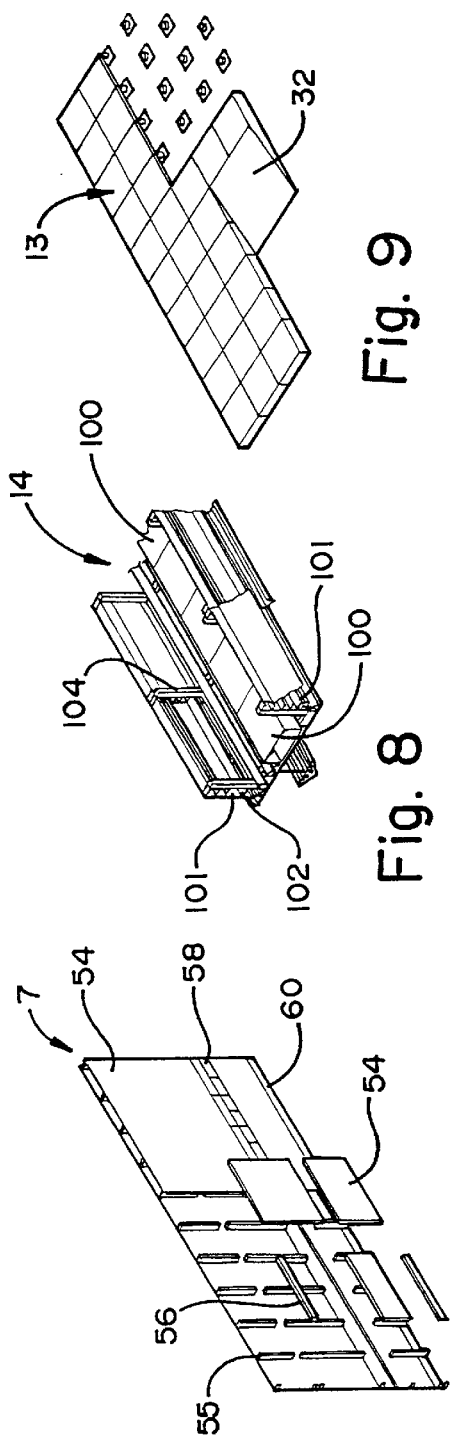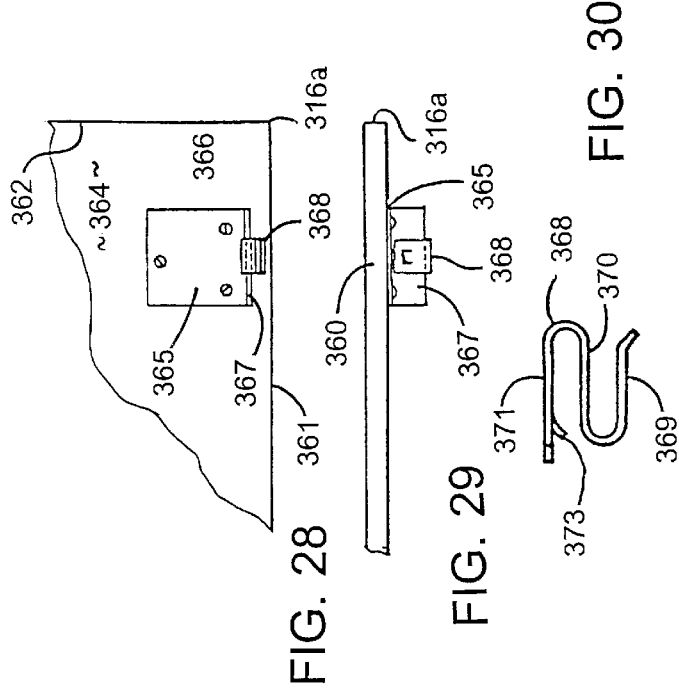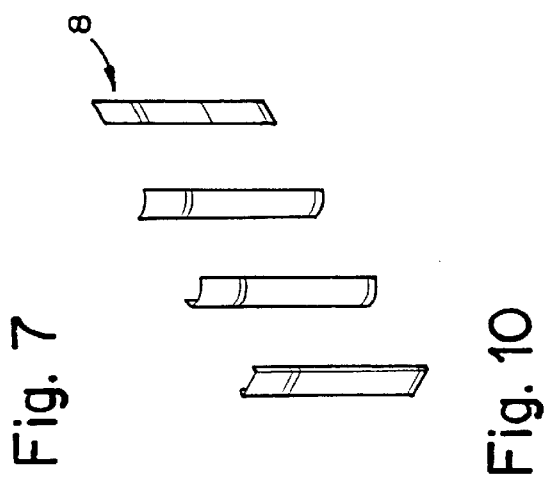

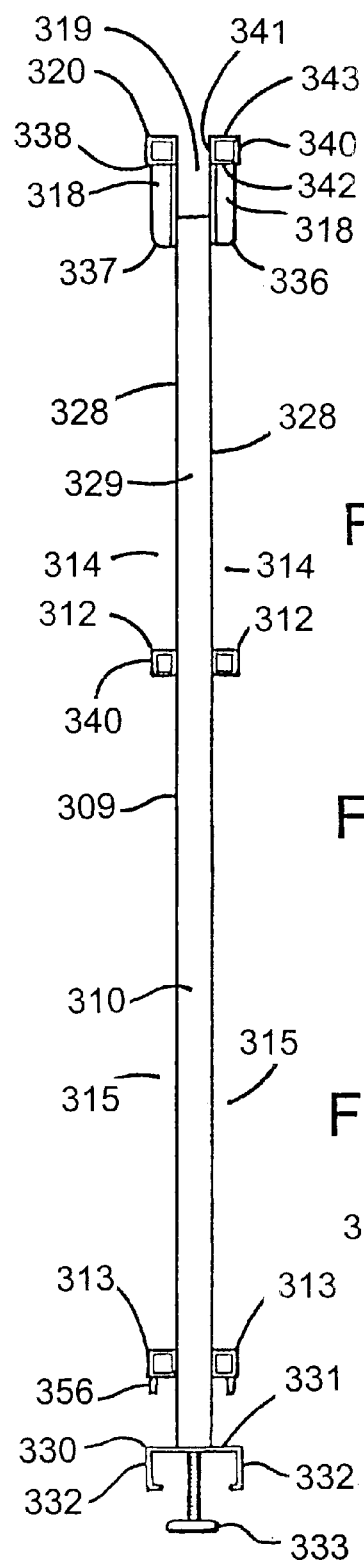
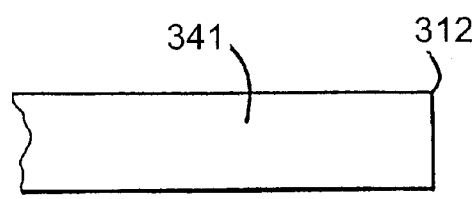
FIG. 35
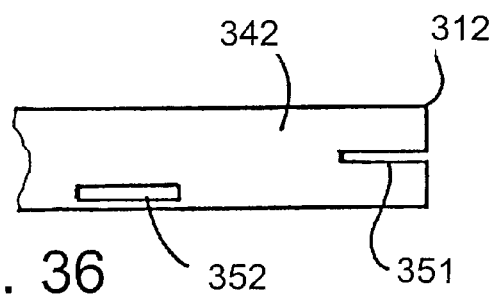
FIG. 36
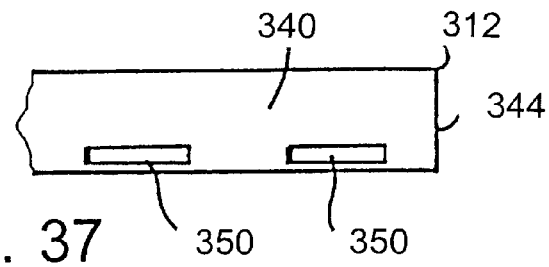
FIG. 37
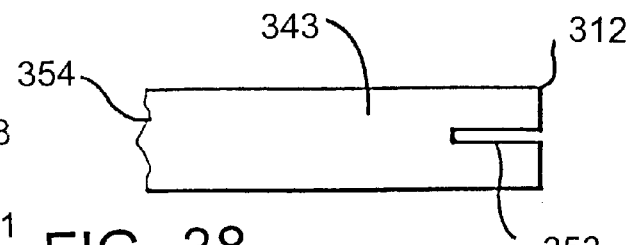
FIG. 38
FIG. 34

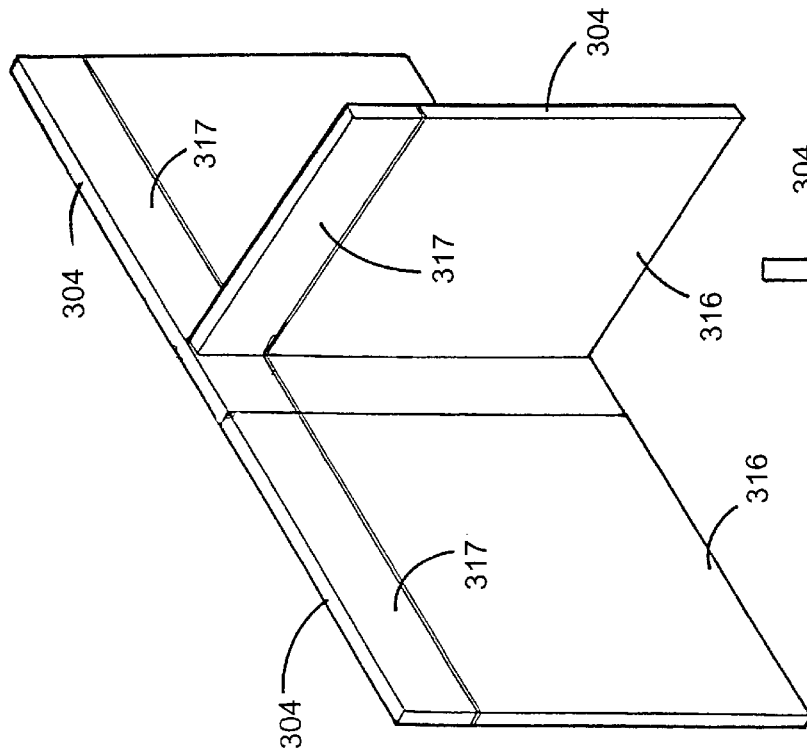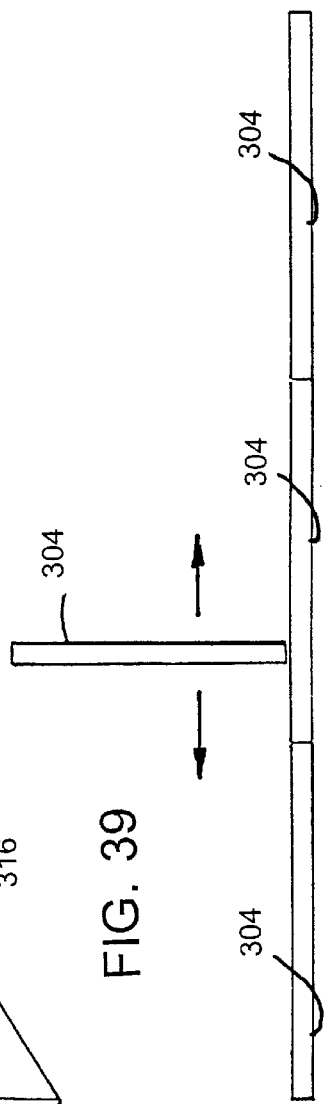

INTEGRATED FURNITURE SYSTEM

CROSS REFERENCE TO RELATED APPLICATIONS

The present application is a continuation of commonly assigned, copending U.S. patent application Ser. No. 09/092,571, filed Jun. 5, 1998, entitled Integrated Prefabricated Furniture System for Fitting-Out Open Plan Building Space, which is a continuation-in-part of U.S. patent application Ser. No. 08/450,253, filed May 25, 1995, entitled Integrated Prefabricated Furniture System for Fitting-Out Open Plan Building Space, now U.S. Pat. No. 5,809,708, issued Sep. 22, 1998, which is a divisional of U.S. patent application Ser. No. 08/367,804, filed Dec. 30, 1994, entitled Integrated Prefabricated Furniture System for Fitting-Out Open Plan Building Space, now U.S. Pat. No. 5,784,843, issued Jul. 28, 1998. It is noted that application Ser. No. 09/092,571 is also a continuation-in-part of U.S. patent application Ser. No. 09/067,731, filed Apr. 28, 1998, entitled Connection System for Partitions, which is a continuation of U.S. patent application Ser. No. 08/579,614, filed Dec. 26, 1995, entitled Partition System, now U.S. Pat. No. 5,746,035, issued May 5, 1998, which is a continuation-in-part of U.S. patent application Ser. No. 08/367,802, filed Dec. 30, 1994, entitled Portable Partition System, now U.S. Pat. No. 5,746,034, issued May 5, 1998, which are hereby incorporated in their entirety herein by reference. Notably, like application Ser. No. 09/092,571, the present disclosure includes one portion that is substantially a copy of a substantial part of the disclosure of application Ser. No. 08/367,802 and another portion that is substantially a copy of the disclosure of application Ser. No. 08/367,804, both of which were filed on Dec. 30, 1994, both of which incorporated each others subject matter, and both of which continued through the chain of continuing applications noted above.

BACKGROUND OF THE INVENTION

The present invention relates to partition arrangements for open office spaces and the like, and in particular to a freestanding portable panel and related partition system.

Portable partition systems for open office spaces, and other similar settings, are well known in the art. Individual partition panels are interconnected in different configurations to form separate offices, workstations, or work settings. The partition panels are extremely durable and can be readily disassembled and reassembled into alternative configurations to meet the ever-changing needs of the user. Examples of such partition systems are provided in U.S. Pat. Nos. 3,822,146; 3,831,330; and 4,144,924, which are owned by Steelcase Inc., the assignee of the present application.

Most such partition panels are capable of carrying wires in some fashion, so as to provide electrical power at the various workstations for computers, typewriters, dictating equipment, task lighting, and other electrical appliances. These partition panels are also typically capable of routing cabling for telephones, computers, signaling, etc. to the individual workstations. Examples of such panel wiring systems are disclosed in U.S. Pat. Nos. 4,429,934; 4,060,294; 4,228,834; and 4,382,648. Wireways and/or raceways are normally provided within the interiors of the panels to carry the utilities throughout the panel system.

However, the space available for utility raceways in many such panel systems is rather limited. This is particularly true with respect to several of the older style partition panel systems. The advent of computerized workstations, with sophisticated communication systems and other electronic support equipment, has greatly increased the need for partition panels to carry more power and cabling throughout the panel system. It has also increased the need for privacy is some areas, which is provided by floor-to-ceiling systems, while also increased the need for open communication in other areas, which is better provided by low height, see-over partitions.

The finishing or fitting-out of building spaces for offices, medical treatment facilities, and other similar environments has become a very important aspect of effective space planning and layout. Work patterns, technology, and business organizations are constantly evolving and changing. The building space users require products which facilitate change at lower costs. Space planning is no longer a static problem. Changing technology and changing work processes demand that a design and installation be able to support and anticipate change. At the same time, appearance of the building space has become increasingly important to customers and occupants, particularly as companies have realized the importance and positive (or negative) effect on worker's attitudes and their ability to do a job efficiently. Accordingly, one very important requirement of this integrated furnishing system is to provide a freestanding portable partition system, an existing building wall-covering system, and a floor-to-ceiling partition system, each of which have enhanced utility carrying capabilities and are reconfigurable, and that are integrated together to provide a novel attractive appearance even after reconfiguration. A further important aspect is to provide a completely integrated system adapted to finish a complete building space, including floors, columns, storage areas, office and group areas, customized on-site built walls, prefabricated walls and partition panels, and the like.

SUMMARY OF THE INVENTION

In one aspect of the present invention, a furniture system is provided for subdividing a building space defined by existing building walls, such as drywall covered building walls, and for facilitating routing of utilities throughout the building space. The furniture system includes a wall-covering system including a framework of horizontally extending mounting channels with a first side adapted to stably engage the existing building walls and constructed to be secured thereto, and a second side configured to support first cover panels, and further including a plurality of the first cover panels releasably attached to the second side for covering the framework and for at least partially covering the existing building wall. The framework forms at least one horizontally extending first raceway with the first cover panels on the existing building wall so that utilities can be flexibly routed in the wall-covering system across the existing building wall. The furniture system further includes a freestanding partition system including partition panels with preassembled partition frames arranged and interconnected to subdivide the building space into office areas and including second cover panels releasably attached to opposing side faces of the partition frames for covering both side faces of the partition frames. The partition frames are characteristically internally open so that utilities can be flexibly routed along and within the partition frames under the second cover panels. The partition system includes at least one partition panel with an end abutting the wall-covering system and the partition frames have open ends that are configured so that the utilities can be easily routed from the wall-covering system to the freestanding partition system through the abutting end of the freestanding partition system.

In another aspect of the present invention, a method is provided for dividing a building space defined by existing building walls, such as drywall covered walls, and for facilitating routing of utilities throughout the building space. The method includes providing a wall-covering system including a framework of horizontally extending mounting channels with a first side adapted to stably engage the existing building walls and constructed to be secured thereto, and a second side for supporting first cover panels, and further including a plurality of the first cover panels releasably attached to the second side for covering the framework and for at least partially covering the existing building wall. The framework forms at least one horizontally extending first raceway with the first cover panels on the existing building wall so that utilities can be flexibly routed in the wall-covering system across the existing building wall. The method further includes providing a freestanding partition system including partition panels with partition frames arranged and interconnected to subdivide the building space into office areas and including second cover panels releasably attached to opposing side faces of the partition frames for covering both side faces of the partition frames. The partition frames are characteristically internally open so that the utilities can be flexibly routed along the partition frames under the second cover panels. The method still further includes attaching the wall-covering system to the existing building wall by attaching the mounting channels to the existing building wall, positioning the partition frames in a desired arrangement in the building space to define office areas, including positioning and securing one end of at least one partition panel abuttingly against the wall-covering system, routing utilities throughout the building space and to the office areas by routing the utilities from the existing building wall into the framework and continuously along the framework and into the partition frames, covering the framework with the first cover panels, and covering the partition frames with the second cover panels.

In yet another aspect of the present invention, an integrated prefabricated furniture system is provided for fitting-out building space of the type having a generally open plan interior defined by fixed walls. The furniture system includes a demounted architectural wall system for covering the fixed walls of an associated building room, including a plurality of horizontally extending mounting channels for attachment to the fixed walls along upper and lower portions thereof. Some of the mounting channels are attached to the fixed walls at a position vertically in between the upper and lower portions thereof, adjacent a predetermined worksurface height. The mounting channels define a worksurface high wireway. The wall system further includes a plurality of first cover panels, at least some of which are full width and have a horizontally elongated front elevational shape and are detachably attached to the mounting channels to thereby cover the fixed walls. The furniture system further includes a portable partition system for spatially dividing the open plan interior of the associated building room into a plurality of work settings. The portable partition system includes a plurality of freestanding panels detachably interconnected side-by-side in a predetermined plan configuration. The freestanding panels have internal frames, at least some of which define a horizontally extending utility raceway positioned adjacent the predetermined worksurface height. The portable partition system further includes a plurality of second cover panels, each having a horizontally elongated front elevational shape and being detachably attached to the opposite sides of said frames to enclose the same. At least some of the internal frames abut the demountable architectural wall system so that wires and cabling can be routed from the demountable architectural wall system to the portable partition system, and wherein the first cover panels of the demountable architectural wall system and the second cover panels of the portable partition system each have first and second belt-high cover panels that have a narrow but substantially equal width and are positioned at a common height to present a uniform horizontal appearance datum throughout the building room.

These and other advantages of the invention will be further understood and appreciated by those skilled in the art by reference to the following written specification, claims, and appended drawings.

BRIEF DESCRIPTION OF THE DRAWINGS

FIG. 2 is a perspective view of a portable partition wall system, which is part of the furniture system;

FIG. 3 is a perspective view of a pre-assembled facade system, which is part of the furniture system;

FIG. 4 is a perspective view of a freestanding storage case system, which is part of the furniture system;

FIG. 5 is perspective view of a space frame system to support group and individual activities in an open plan, which is part of the furniture system;

FIG. 6 is an exploded, perspective view of a demountable architectural wall system, which is part of the furniture system;

FIG. 7 is an exploded, perspective view of a demountable movable wall system, which is part of the furniture system;

FIG. 8 is a perspective view of a modular overhead link-head system, which is part of the furniture system;

FIG. 9 is a perspective view of a prefabricated low raised floor system, which is part of the furniture system;

FIG. 10 is a perspective view of a modular column cover system, which is part of the furniture system;

FIG. 28 is a fragmentary, rear elevational view of the cover panel of FIG. 27 showing a mounting clip thereon;

FIG. 29 is a fragmentary, top plan view of the cover panel shown in FIG. 28;

FIG. 30 is a side elevational view of the mounting clip of FIG. 29;

FIG. 34 is a side elevational view of the base panel frame of FIG. 33;

FIG. 35 is a fragmentary, top plan view of a horizontal stringer portion of the base panel frame of FIG. 33;

FIG. 36 is a fragmentary, bottom plan view of the horizontal stringer shown in FIG. 35;

FIG. 37 is a fragmentary, front elevational view of the stringer shown in FIGS. 35 and 36;

FIG. 38 is a fragmentary, rear elevational view of the horizontal stringer shown in FIGS. 35–37;

FIG. 39 is a perspective view of three of the partition panels, of which two are interconnected in-line, and one is interconnected at an angle or branched to the in-line panels;

FIG. 40 is a partially schematic, top plan view of the panels shown in FIG. 39 wherein the branched panel can be interconnect anywhere along the in-line panels;

DETAILED DESCRIPTION OF THE PREFERRED EMBODIMENTS

Figure 1:
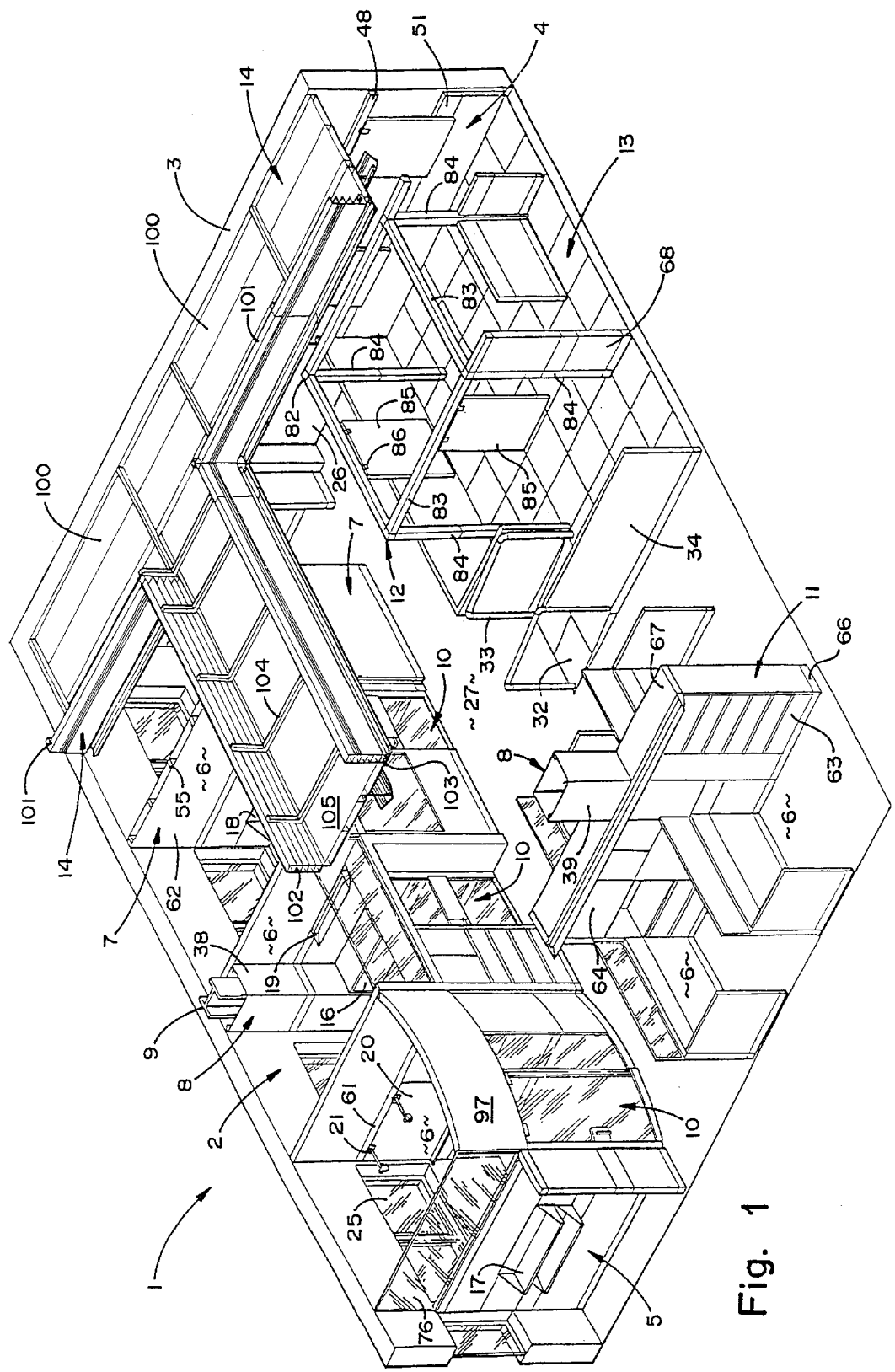
FIG. 1 is a perspective view of an integrated prefabricated furniture system embodying the present invention.

For purposes of description herein, the terms "upper," "lower," "right," "left," "rear," "front," "vertical," "horizontal," and derivatives thereof shall relate the invention as oriented in FIGS. 1 and 2. However, it is to be understood that the invention may assume various alternative orientations and step sequences, except where expressly specified to the contrary. It is also to be understood that the specific devices and processes illustrated in the attached drawings and described in the following specifications are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates an integrated prefabricated furniture system embodying the present invention. Furniture system 1 is particularly adapted for finishing or fitting-out building space, rooms, etc. 2 of the type having a generally open plan interior defined by fixed interior and exterior walls 3. Such building spaces 2 are typically designed for use as offices, facilities for education/training, hotels/motels, conference centers, medical treatment, and other similar purposes. A demountable architectural wall system 4 (Plus wall) covers the fixed walls 3 of building room 2, a portable partition wall system 5 (Zone wall) divides the interior space of the building room into individual workstations or work settings 6, and a demountable movable wall system 7 (Link wall) forms custom width partitions. The three wall systems 4, 5, and 7, which are shown individually in FIGS. 6, 2, and 7, respectively, are completely compatible and fully integrated in both function and appearance. A modular column cover system 8 selectively covers support columns 9 in building room 2, and provides vertical utility routing and storage that integrates with wall systems 4, 5, and 7. A pre-assembled facade system 10 cooperates with wall systems 4, 5, and 7 to create finished entryways for work settings 6. A freestanding case storage system 11 matches wall systems 4, 5, and 7 for complete integration with the same. A space frame system 12 is particularly beneficial in supporting group activities and the like, and includes utility raceways which communicate with wall systems 4, 5, and 7 to effectively and efficiently distribute utilities throughout building room 2. A prefabricated low raised floor system 13 is supported directly on the floor of building room 2, and conforms with the various furniture elements to provide support for those work settings 6 requiring maximum utility capabilities. A modular overhead link-head system 14 is supported from the building ceiling, and routes utilities therethrough to minimize fixed building wiring, plumbing, lighting, etc. Furniture accessories, such as hang-on binder bins 16, shelves 17, paper managers 18, task lighting 19, displays 20, etc. are designed to be used anywhere throughout furniture system 1. Furniture system 1 is readily reconfigurable to meet the ever-changing needs of the user and minimize permanent leasehold improvements.

Figure 11:
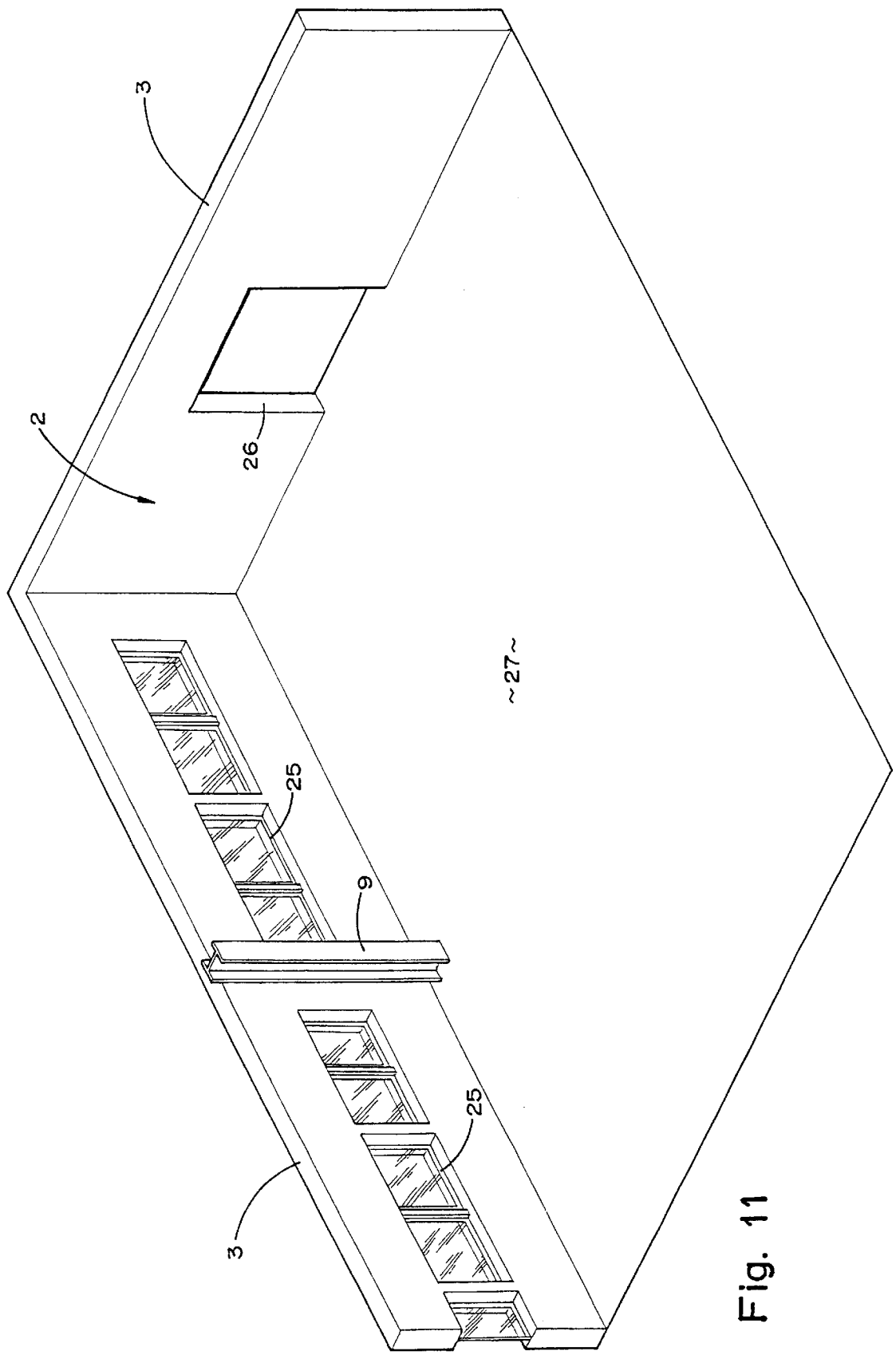
FIG. 11 is a perspective view of an unfinished building room of the type having an open plan interior defined by fixed walls and including support columns.

The illustrated building room 2 (FIG. 11) is exemplary of typical new open office space, wherein fixed or demising walls 3 include windows 25, and entryway 26, as well as a floor surface 27. In the case of new construction, building room 2 is preferably a shell, left substantially unfinished, without any coverings on the interior of walls 3 or on floor 27, and without utilities, such as wiring, lighting, plumbing, HVAC, fire sprinklers, etc. being installed therein. In existing building structures, the current coverings can either be augmented, replaced or covered over by furniture system 1. As will be appreciated by those skilled in the art, furniture system 1 is particularly adapted to be used wherever work is conducted, including offices, residences, airports, etc.

Figure 12:
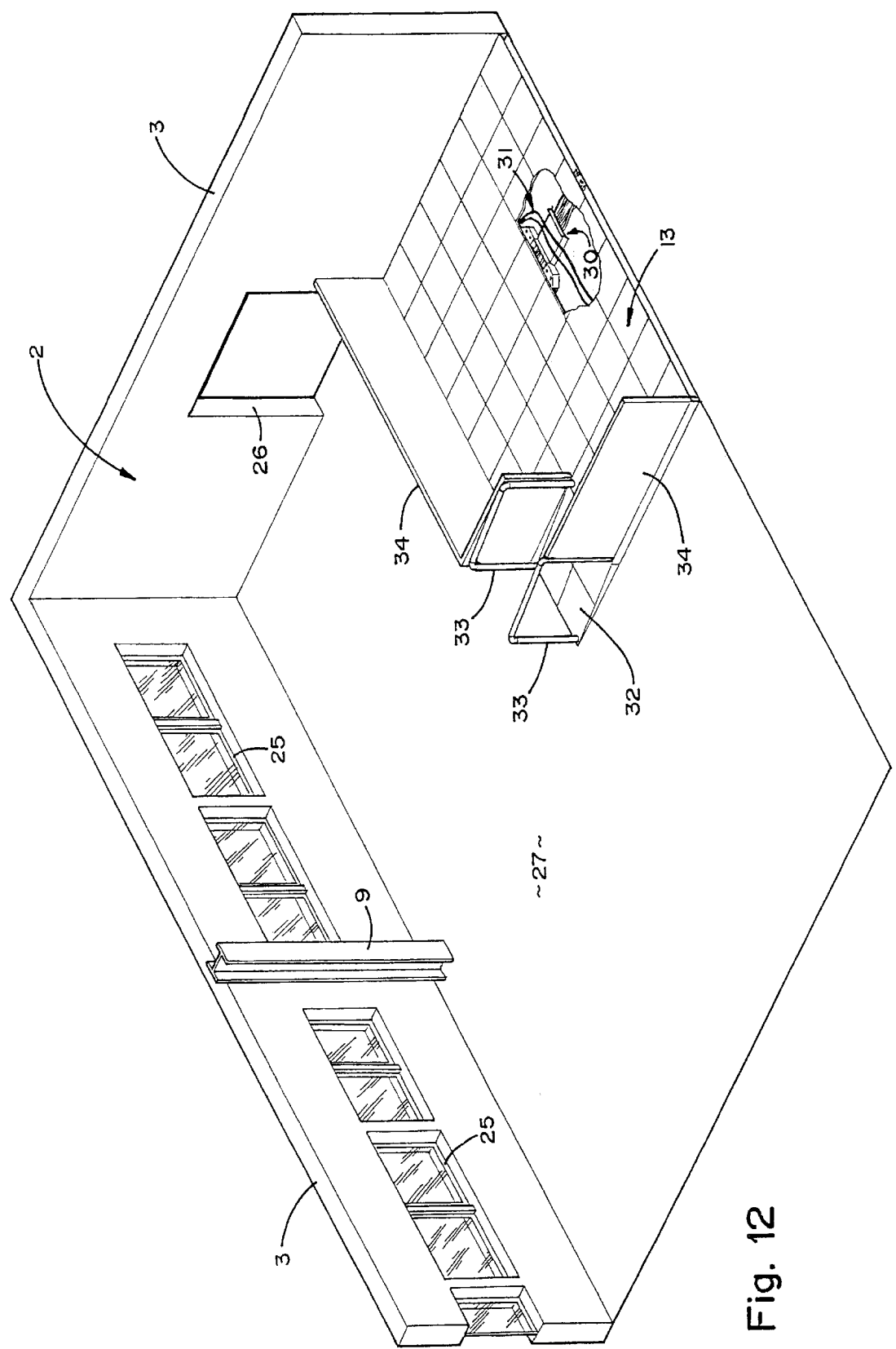
FIG. 12 is a perspective view of the building room with the prefabricated floor system installed therein.

The illustrated raised floor system 12 (FIGS. 9 and 12) has a prefabricated construction and is abuttingly supported directly on the floor surface 7 of building room 2. Although floor system 2 contemplates a wide variety of different constructions, preferably it has a thin raised construction with a relatively low profile to facilitate easy ingress and egress from floor surface 27 of building room 2. Examples of suitable floor systems 12 are provided in commonly assigned U.S. Pat. No. 5,483,776, issued Jan. 16, 1996, entitled Utility Floor Construction, as well as commonly assigned, copending application Ser. No. 08/063,463, filed May 18, 1993, entitled Utility Distribution System, which are incorporated herein by reference. Regardless of the specific construction of low raised floor system 13, it has a hollow interior with optional raceways 30 and 31 (FIG. 12) therethrough in which utilities are routed to their desired locations. In the illustrated example, floor raceways 30 and 31 isolate power wires from data and signal cables to alleviate interference therebetween. A ramp area 32 of floor system 13 facilitates ingress and egress between floor system 13 and the floor surface 27 of building room 2, while rails 33 and partitions 34 are provided about the open peripheral edges of floor system 12.

Figure 13:
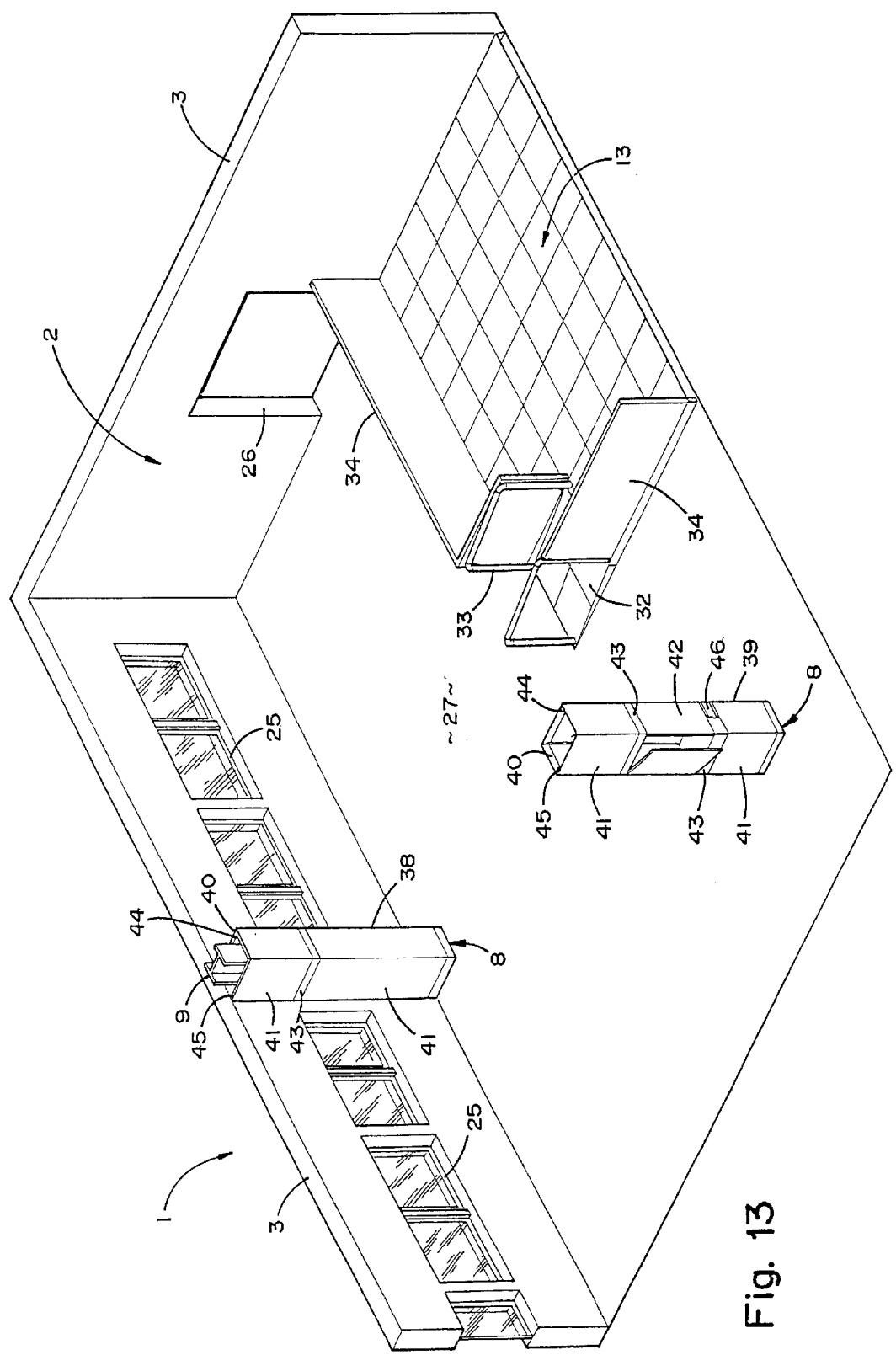
FIG. 13 is a perspective view of the building room and furniture system shown in FIG. 13, and wherein the modular column cover system is installed therein.

The illustrated column cover system 8 (FIG. 13) is designed to selectively enclose the building support columns 9, as in column cover unit 38, or form freestanding utility cabinets, as in column cover unit 39. Both column cover units 38 and 39 have a substantially identical construction, wherein each includes an internal framework 40 on which removable cover panels 41–43 are mounted to enclose the same. Column cover units 38 and 39 have a top plan shape and configuration which is substantially larger than that of the associated building columns 9, so as to provide space between the same in which vertical corner raceways 44 and 45 are formed. The space between column cover unit 38 and an associated building column 9 also permits adjusting the distance between fixed building structures to accommodate regular wall panel widths, as described in greater detail below. The column cover units 38 and 39 may also be equipped with horizontal raceways 46 disposed immediately behind one or more of the narrow cover panels 43. In the cabinet style cover unit 39, one or more of the larger cover panels 41 and 43 may be hingedly mounted on the associated internal framework 40 to provide easy access to the interior of the same. Cabinet style column cover unit 39 may be used to store electronic equipment, such as telephone switches and the like. As shown in FIG. 10, cover panels 42 and 43 can be provided in a variety of different styles and shapes to coordinate or match with the decor of furniture system 1.

Figure 14:
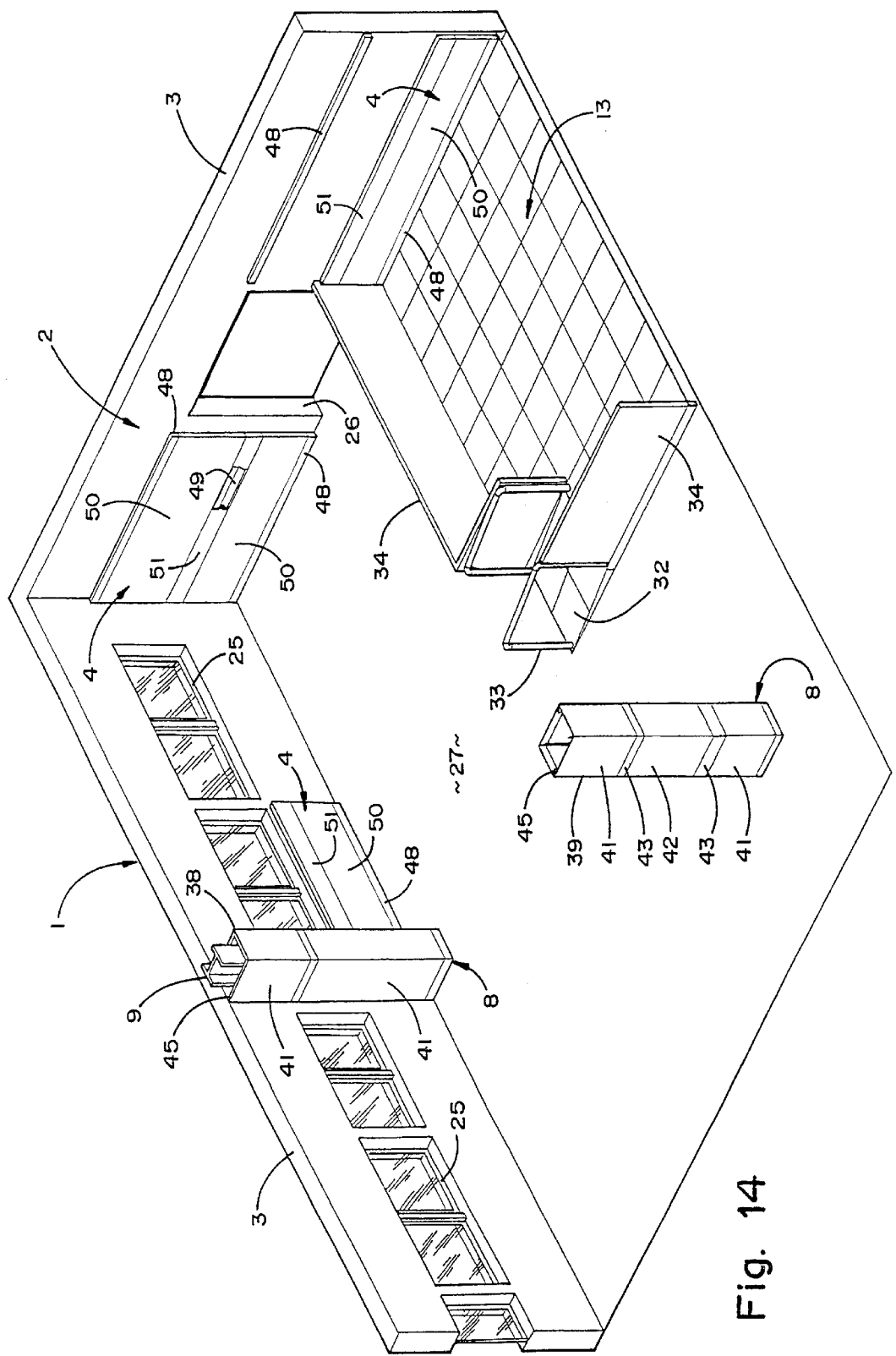
FIG. 14 is a perspective view of the building room and furniture system shown in FIG. 13, and wherein the demountable architectural wall system is installed therein.

The illustrated prefabricated wall system 4 (FIG. 14), which is also referred to herein as the Plus wall system, is a demountable architectural wall system that is particularly designed for covering the fixed walls 3 of building room 2. Plus wall system 4 includes a plurality of horizontally extending mounting channels 48 which are attached to the fixed walls 3 of building room 2 along upper and lower portions thereof. A plurality of horizontally extending belt-high belt zone utility troughs 49 are also provided for attachment to the building room fixed walls 3 at a position vertically between the upper and lower portions thereof, adjacent to standard worksurface height. A plurality of cover panels 50 and 51 are provided, at least some of which are full width and have a horizontally elongated front elevational shape. Cover panels 50 and 51 are detachably mounted on the mounting channels 48 and utility troughs 49 to thereby cover the fixed walls 3. Preferably, mounting channels 48 include a hanger channel on which at least some of the furniture accessories may be supported, including hanging panels, ambient and task lighting, as well as hang-on storage with the use of additive support rails (not shown). The illustrated Plus wall system has both full and partial height segments. In general, Plus wall system 4 is a system of additive architectural wall elements for adding utility and upgrading finish to existing walls. Half columns (not shown) may also be provided for vertical utility distribution along the wall surface.

Figure 15:
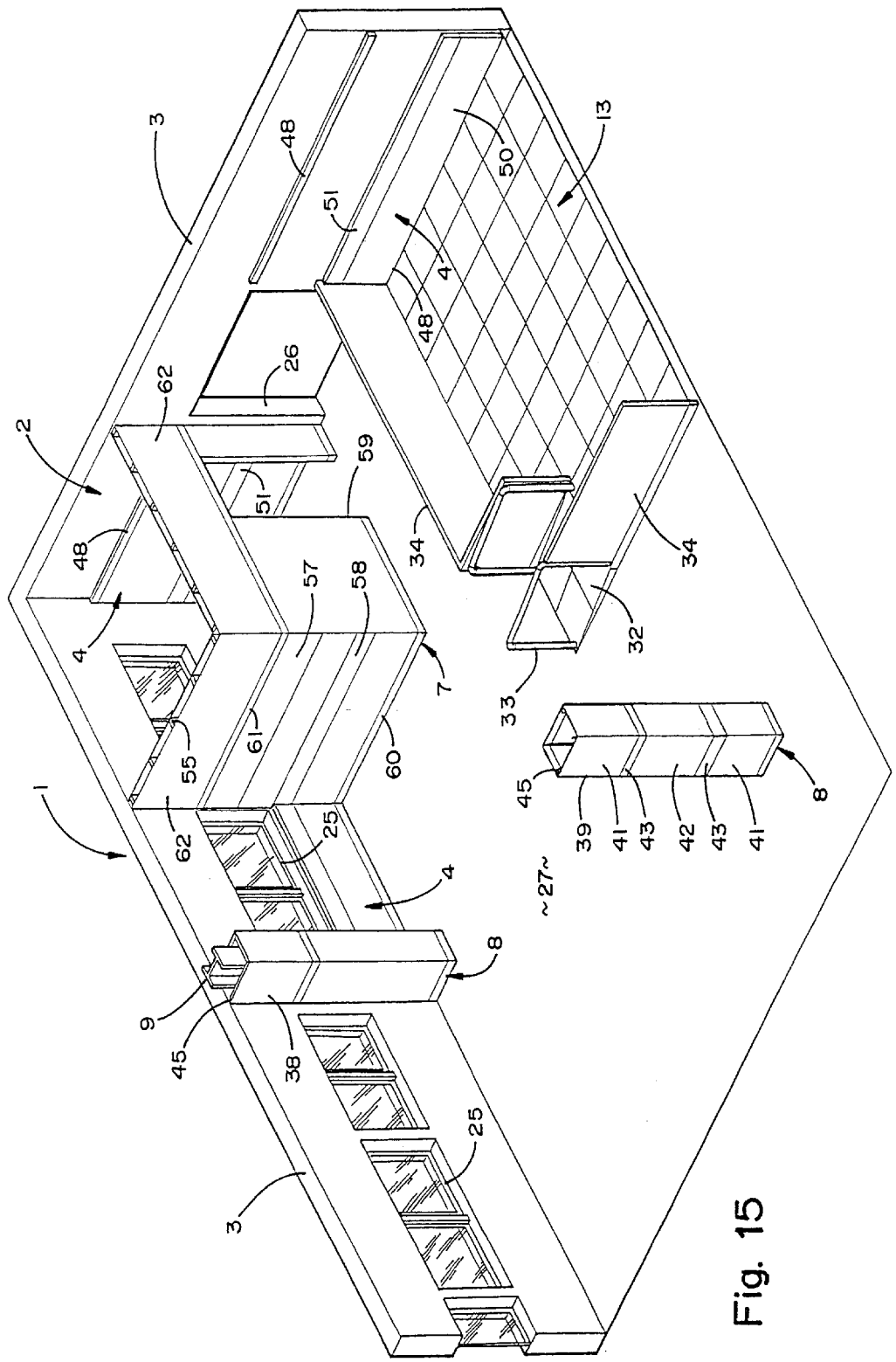
FIG. 15 is a perspective view of the building room and furniture system shown in FIG. 14, and wherein the demountable movable wall system is installed therein.

The illustrated prefabricated wall system 7 (FIG. 15), which is also referred to herein as the Link wall system, is a demountable movable wall system for forming custom width partitions that are compatible with the Plus wall system 4 and the Zone wall system 5. Link wall system 7 includes a plurality of vertical studs 55, adapted to be positioned in a side-by-side relationship. A plurality of horizontal channels 56 are provided in different lengths to facilitate custom fabricating the partitions 54 in different widths, including channels located at a belt-high height. Each beltway channel 56 is shaped to be attached to the studs 55 adjacent standard worksurface height to rigidly interconnect the same in a mutually parallel relationship, and permit the continuous routing of utilities therethrough, along with the belt zone utility troughs 49 on Plus wall system 4, as well as Zone wall system 5. A plurality of cover panels 57 and 58 are detachably mounted on the opposite sides of studs 55 to enclose the same. In the example shown in FIG. 15, the Link wall system 7 has base raceways 60 along the bottom edges of partitions 54, expressway raceways 61 along the top edges of partitions 54, and transoms 62 mounted on top of expressway raceways 61, which extend to the ceiling.

Figure 16:
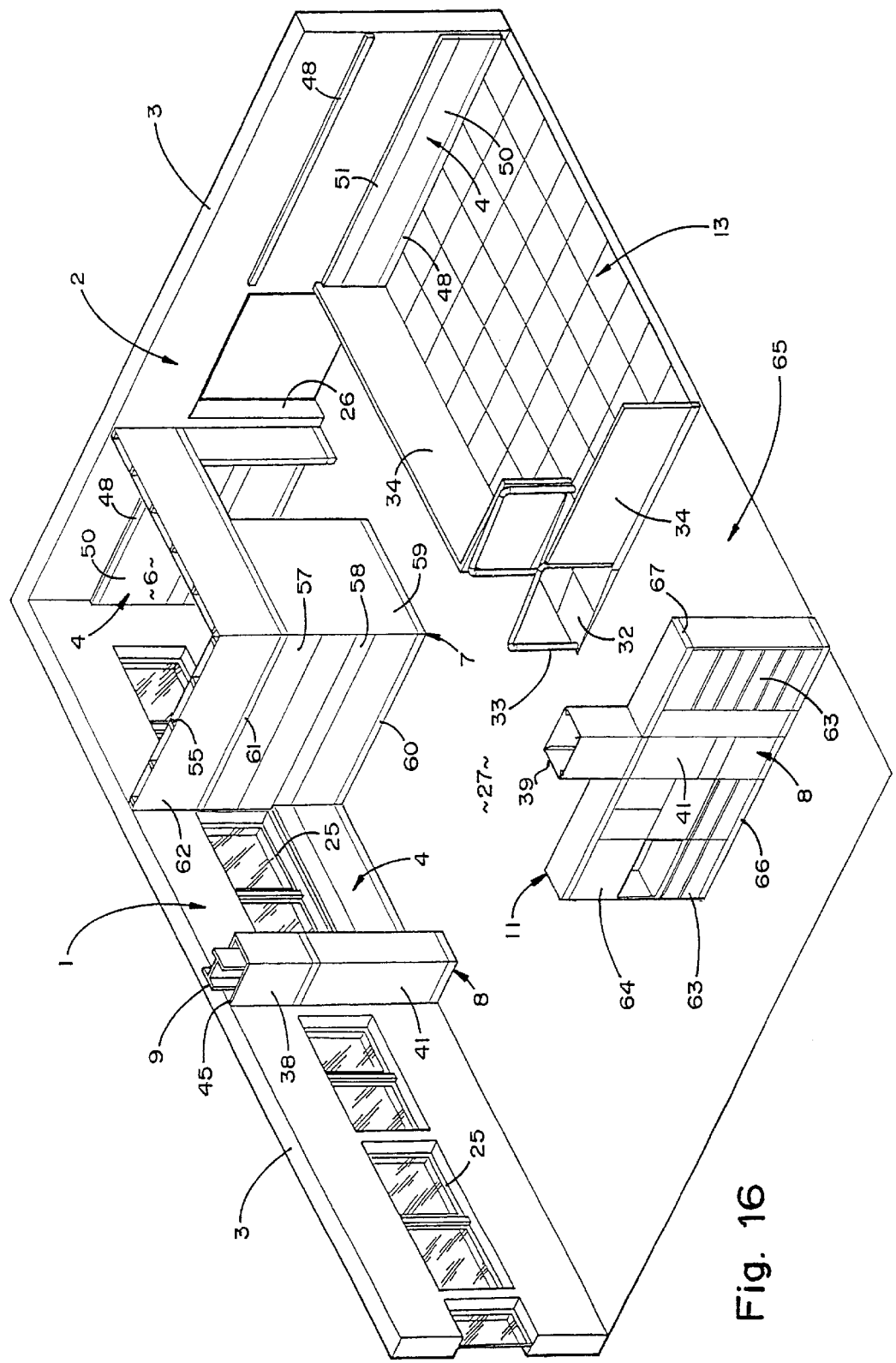
FIG. 16 is a perspective view of the building room and furniture system shown in FIG. 15, and wherein the freestanding storage case system is installed therein.

The illustrated storage wall system 11 (FIG. 16) includes a plurality of modular cases including file cabinets 63 and storage cabinets 64, which are designed to be arranged horizontally in a side-by-side relationship, to create both partial and full partition walls. The front faces of cabinet 63 and 64 can be oriented in either direction, so as to provide access from the desired area of building room 2. In the example illustrated in FIG. 16, file cabinets 63 and storage cabinets 64 are stacked above eye level height, and are positioned on opposite sides of the cabinet style column cover 39 to create a wall which defines one of the work settings 6 on one side and an aisle 65 on the opposite side. The illustrated storage wall system 11 has a powered base 66 and a full expressway raceway 67. Utilities may also be distributed vertically within storage wall system 11.

Figure 17:
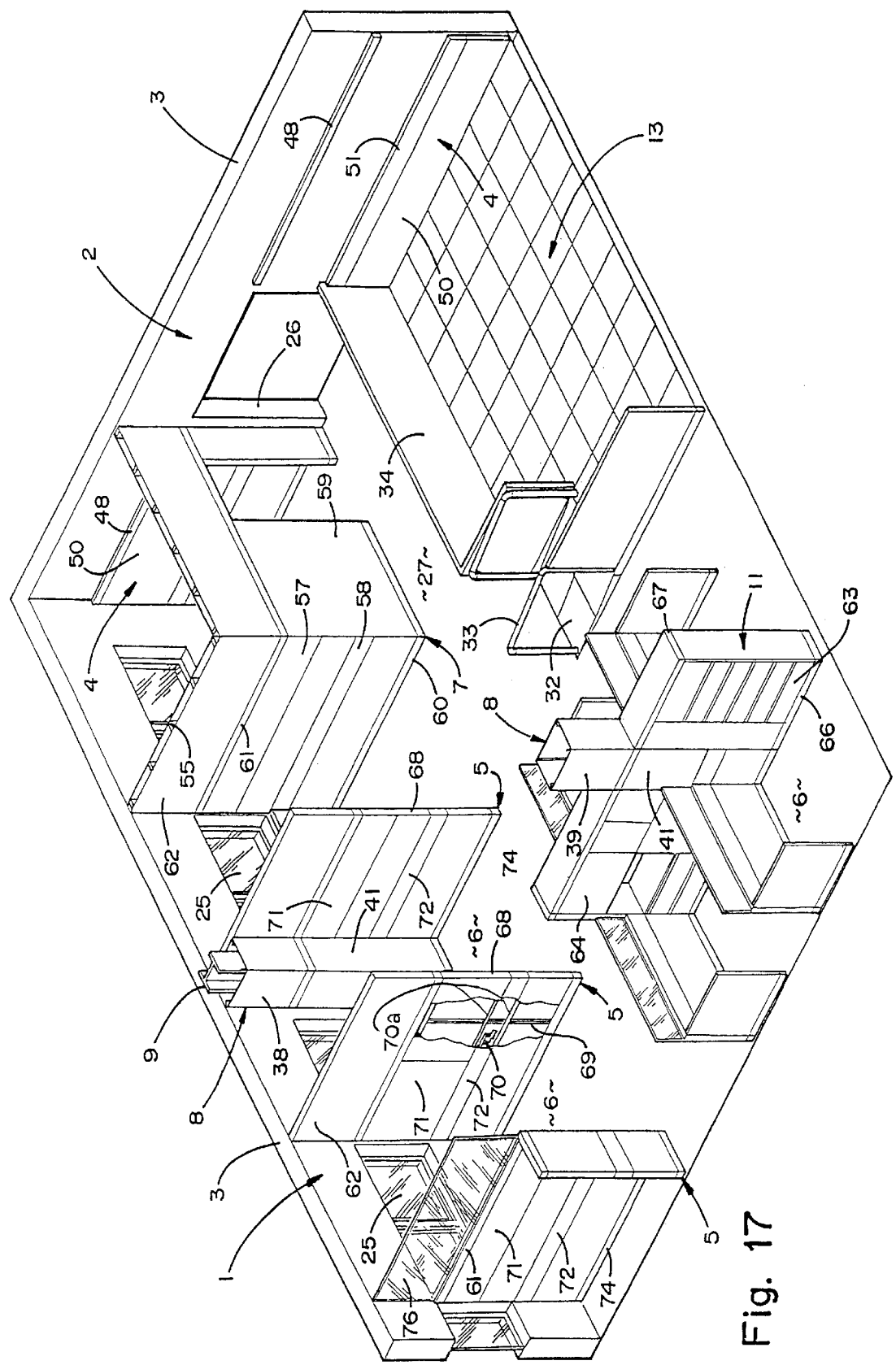
FIG. 17 is a perspective view of the building room and furniture system shown in FIG. 16, and wherein the portable partition wall system is installed therein.

The illustrated prefabricated wall system 5 (FIG. 17), which is also referred to herein as the Zone wall system, is a portable partition system that spatially defines the open plan interior of the building room 2 into individual and group work settings 6. Zone wall system 5, which is disclosed in greater detail in U.S. Pat. No. 5,746,034, issued May 5, 1998, entitled Partition System, which has been incorporated herein, generally includes a plurality of freestanding panels 68 interconnected side-by-side in a predetermined plan configuration. Each Zone wall panel 68 has an internal frame 69, at least some of which include a horizontally extending, belt-high utility raceway 70 defined by internal frame members 70a that are positioned adjacent a belt-high worksurface height. A plurality of cover panels 71 and 72 are provided, each having a horizontally elongated front elevational shape and being detachably mounted on opposite sides of the frame 69 to enclose the same. In particular, the cover panels 71 are configured to cover the belt-high utility zone. In the illustrated examples, Zone wall panels 68 also include base raceways 74 extending along the bottom edges of the panels, and expressway raceways 61 extending along the top edges of the panels, as well as glass transoms 76 and full transoms 62. The full transoms 62 may have hollow interiors through which wires, cables, and other utilities can be routed. Vertical drops are provided within the interior of panels 68 to provide power and signal anywhere between base raceway 70 and expressway raceway 61. In general, Zone wall system 5 is a stacking system which begins with a base which provides a low height, see-over sitting panel. Stackers are available to provide no see-over sitting, no see-over standing, and above door height configurations. Panels 68 can be provided in different widths to carry additional utilities.

Figure 18:
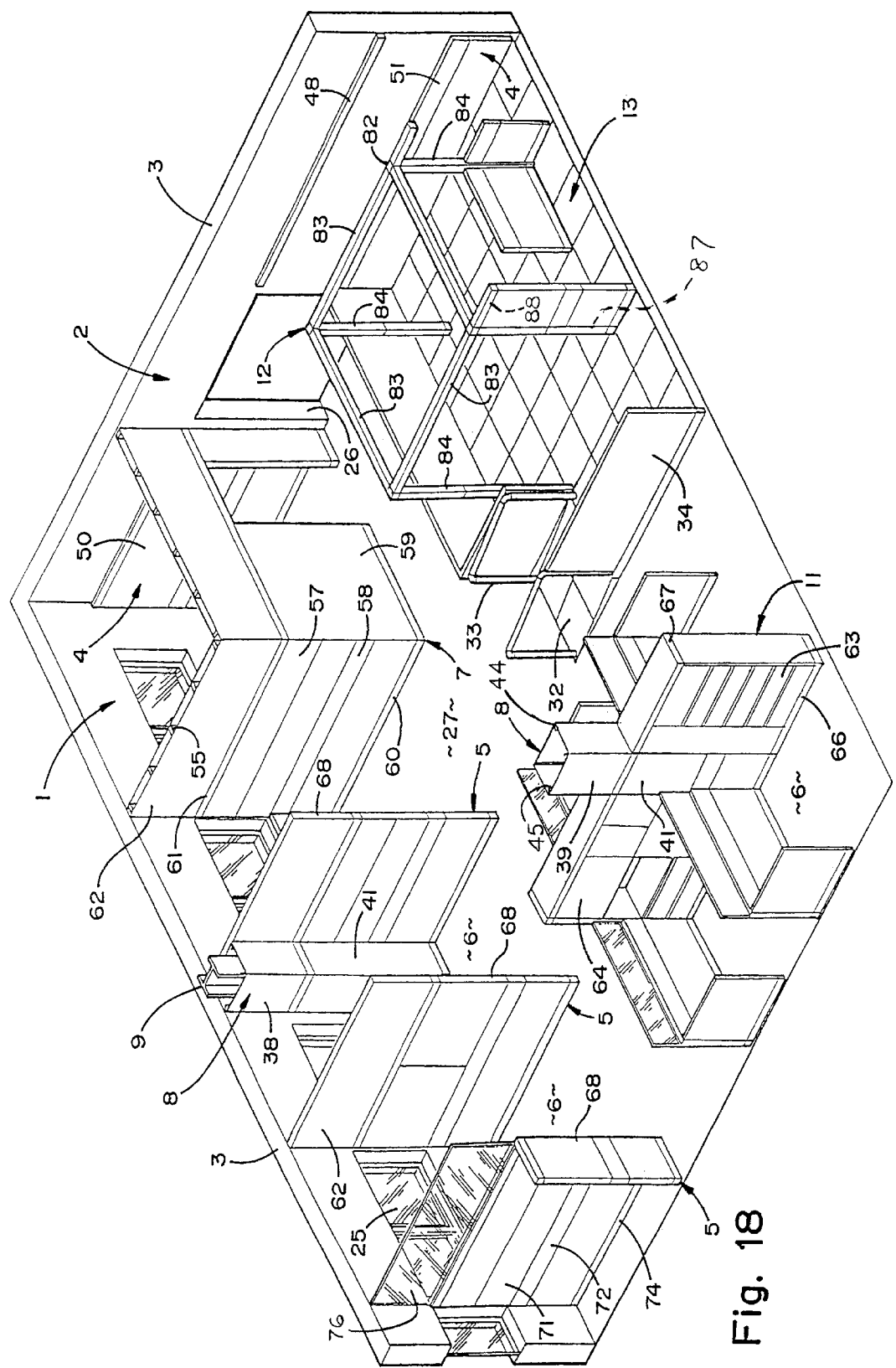
FIG. 18 is a perspective view of the building room and furniture system shown in FIG. 17, and wherein the space frame and the prefabricated floor systems are installed therein.

The illustrated space frame system 12 (FIG. 18) is particularly designed to support group work activities in an open portion of the open plan interior of associated building room 2. Space frame system 12 is disclosed in greater detail in commonly assigned U.S. Pat. No. 5,511,348, issued Apr. 30, 1996, entitled Furniture System, and in the illustrated example includes an overhead framework 82, comprising a plurality of frame segments 83 interconnected in an end-to-end fashion to form a rigid structure configured to be positioned above the floor surface 27. Space frame system 12 also includes a plurality of overhead support columns 84, each having an upper portion thereof connected with overhead framework 82, and a lower portion thereof shaped to abut the prefabricated floor system 13. It is to be understood that space frame system 12 can also be supported directly on the floor surface 27 of building room 2. In any event, columns 84 support framework 82 in a freestanding fashion within building room 2 at a predetermined elevation above average user height. Space frame system 12 also includes a plurality of individual panels 85 which have a lightweight construction to permit easy, manual, bodily translation of the same by an adult user. The panels 85 include connectors 86 that detachably mount the same on overhead framework 82 at various locations therealong in a manner in which panels 85 hang downwardly from overhead support 82 in a generally vertical orientation, and are readily and easily manually removable therefrom and reconfigurable thereon by the user. Panels 85 may include sound attenuation to facilitate partitioning, as well as special exterior surfaces for displays. The horizontal frame segments 83 of framework 82, as well as support columns 84 include utility raceways 87 and 88 associated therewith to facilitate providing utilities to the associated work area. In one example of the present invention, frame segments 83 and support columns 84 have substantially hollow constructions forming raceways 87 and 88 therein, which are divided to physically separate power and cable wires. In the example illustrated in FIG. 18, space frame system 12 is positioned directly on top of prefabricated floor system 13, and a Zone wall panel 68 extends from the outside pair of support columns 84.

Figure 19:
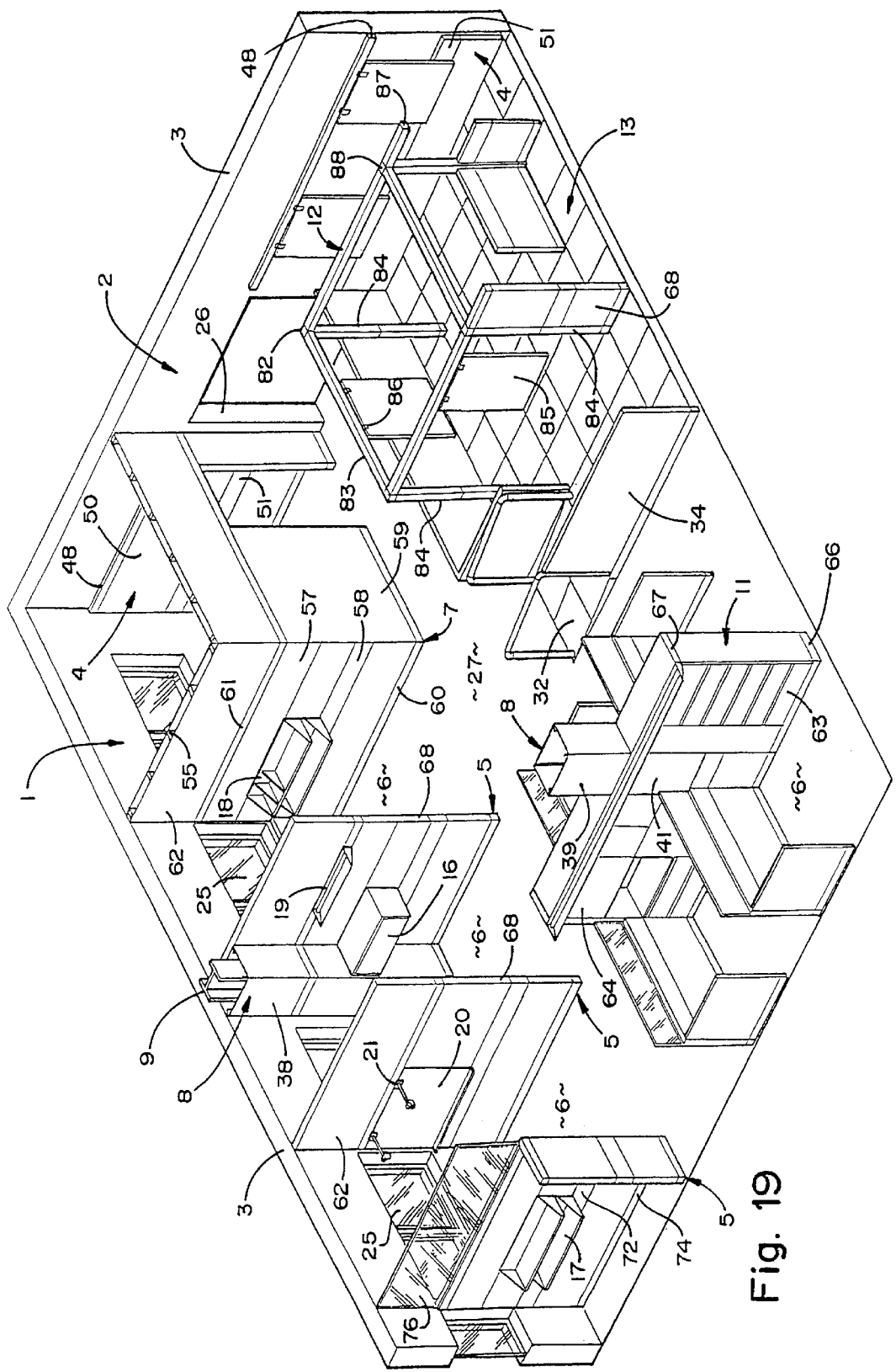
FIG. 19 is a perspective view of the building room and furniture system shown in FIG. 18, and wherein furniture accessories are installed therein.

The illustrated furniture accessories (FIG. 19) are designed to be used anywhere throughout furniture system 1 and are adapted to personalize the individual work settings 6, as well as to provide support for the common work areas, such as at space frame system 12. In the example illustrated in FIG. 19, the furniture accessories include binder bins 16, shelves 17, paper managers 18, task lighting 19, displays 20, and display hooks 21. The furniture accessories 16–21 can be hung from Plus wall system 4, Zone wall system 5, Link wall system 7, and/or column system 8. The panels 85 associated with space frame system 12 can also be hung not only from framework 82, but also from the mounting channels 48 associated with Plus wall system 4, as well as top edges of Link wall system 7 and Zone wall system 5. In this manner, information can be prepared on panels 85 at a convenient location, and then transferred between the various work settings 6 and/or common work area associated with space frame system 12.

Figure 20:
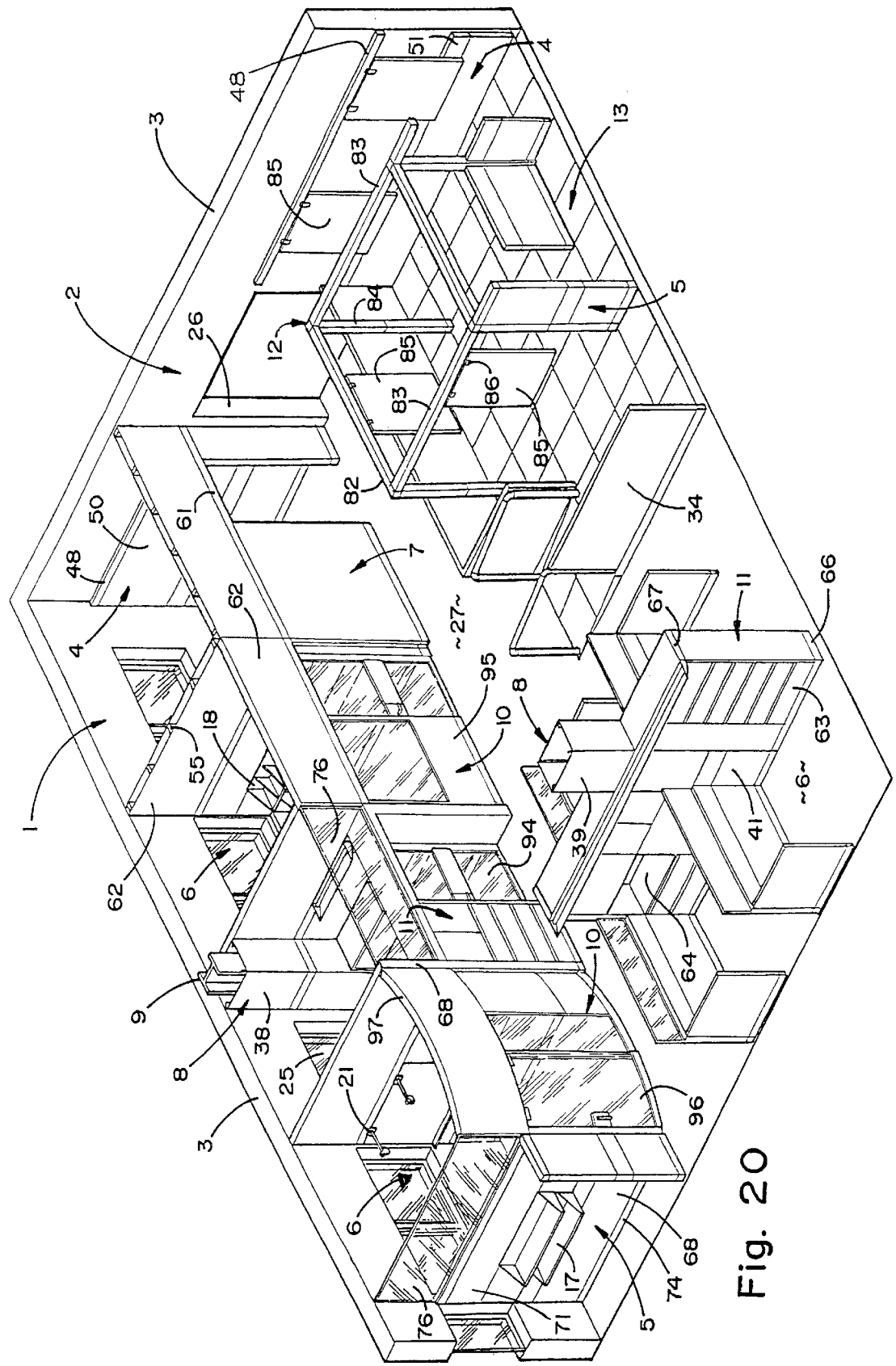
FIG. 20 is a perspective view of the building room and furniture system shown in FIG. 19, and wherein the pre-assembled facade system is installed therein.

The illustrated facade system 10 (FIG. 20) includes a plurality of pre-assembled facade units 92–95 (FIG. 3), each of which includes an entryway and is adapted for connection with wall systems 4, 5, and 7 to completely enclose a given work setting 6. Facade units 93–95 are all straight facades and are provided in different widths and configurations to accommodate different interior layouts. Facade unit 96 (FIG. 20) is curved and includes an arcuate sliding door. In the example illustrated in FIG. 20, facade units 94–96 have a glass transom 76 and full transoms 62 and 97.

Figure 21:
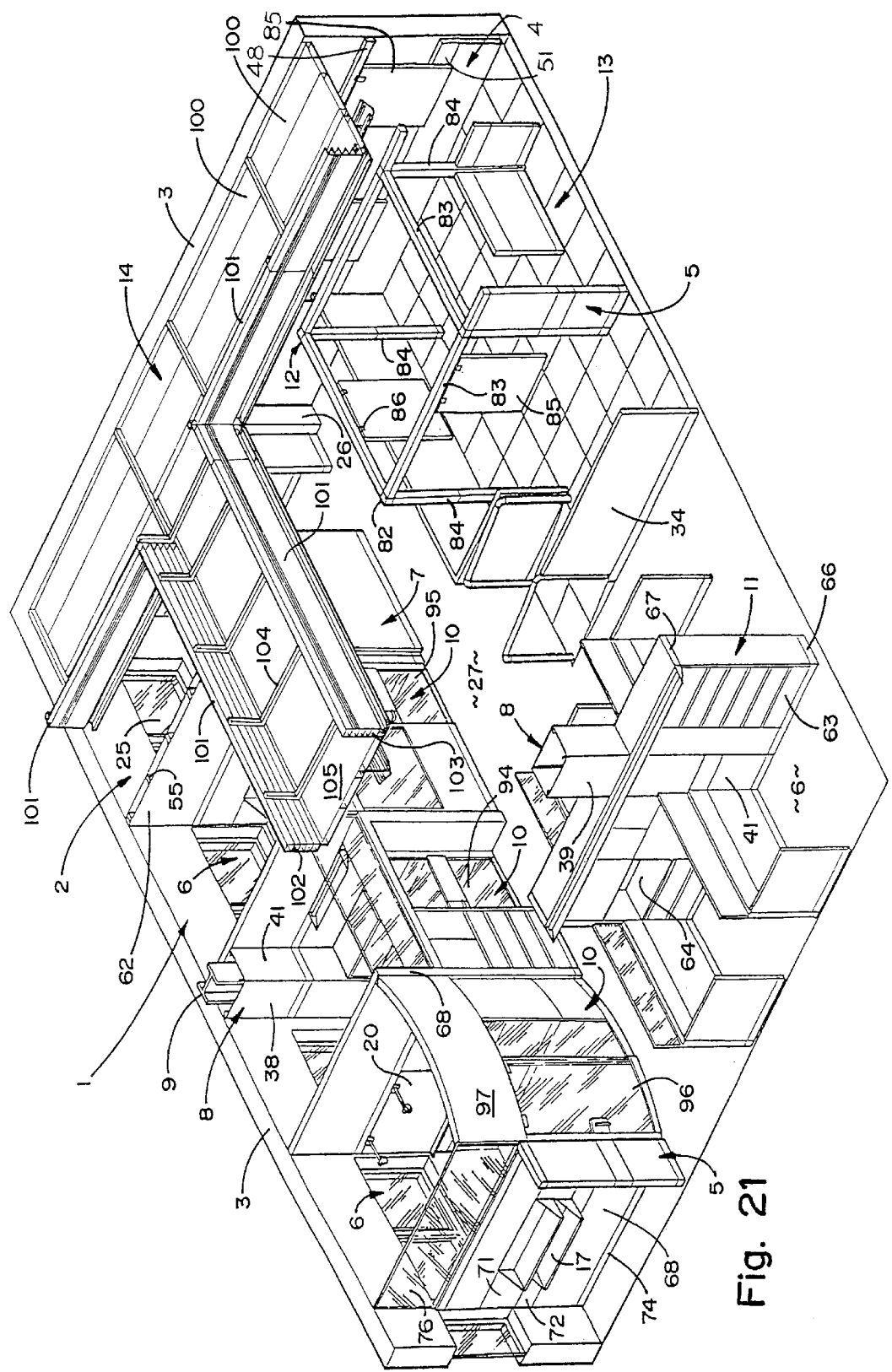
FIG. 21 is a perspective view of the building room and furniture system shown in FIG. 20, and wherein the modular overhead link-head system is installed therein.

The illustrated link-head system 14 (FIG. 21) is designed for overhead routing of utilities throughout building room 2, and comprises plurality of like link-head segments 100, each of which is supported from the structure or ceiling of building room 2, and is mutually interconnected end-to-end to define a continuous housing in which utilities are carried. In the examples illustrated in FIGS. 8 and 21, two pairs of link heads 101 are arranged on opposite sides of each link-head segment 100 to form two sets of vertically stacked raceways 102 and 103. Each of the link-head segments 100 is mounted on an open framework 104, which is in turn suspended from the building structure by adjustable straps or struts. Modular cover panels 105 are mounted on the lower side of framework 104, and extend continuously between the opposite link heads 101, so as to form a U-shaped enclosure through which utility conduits, such as HVAC ducts, sprinkler pipes, power lines, communication lines, etc. can be routed through building room 2. The link heads 101 may include a flat vertically extending common rear wall with a plurality of horizontal flanges extending outwardly therefrom to form the vertically stacked columns of mutually isolated raceways 102 and 103. An accessory hanger channel preferably extends along the lower edge of each link head 101 and is adapted to support a plurality of office accessories thereon, such as lights, motion sensors, etc. Preferably, each of the raceways 102 and 103 is dedicated to a specific type of utility, so that they can be physically separated from one another, and thereby alleviate interference.

The various elements of furniture system 1 are completely compatible and fully integrated in their dimensions, finishes, connections, and utility distribution interface to create a coordinated finished building room 2. For example, the cover panels on Plus wall system 4, Zone wall system 5, and Link wall system 7 may be substantially identical in size and shape, and include detachable frame-engaging connectors configured to permit the same to be interchanged. As previously noted, these cover panels preferably have a horizontally elongated front elevational shape, including upper cover panels having bottom horizontal side edges, and lower cover panels with upper horizontal side edges spaced apart a few inches from the bottom horizontal side edges, which creates a uniform horizontal appearance datum throughout the building room 2 at a belt-high location on the walls. The cover panels are available in common and/or coordinated coverings or finishes. Also, the various raceways associated with wall systems 4, 5, and 7, as well as column cover system 8, facade system 10, and space frame system 12 are preferably provided at common heights, so that they communicate when the units are positioned side-by-side to permit the continuous routing of utilities therethrough. The vertical raceways 44 and 45 in column cover system 8, and the vertical and horizontal raceways 87 and 88 in space frame system 12 are designed to communicate with the horizontal raceways in the remaining elements of the furniture system 1, and particularly assist in transmitting utilities between prefabricated floor system 13 and link-head system 14.

Figure 22:
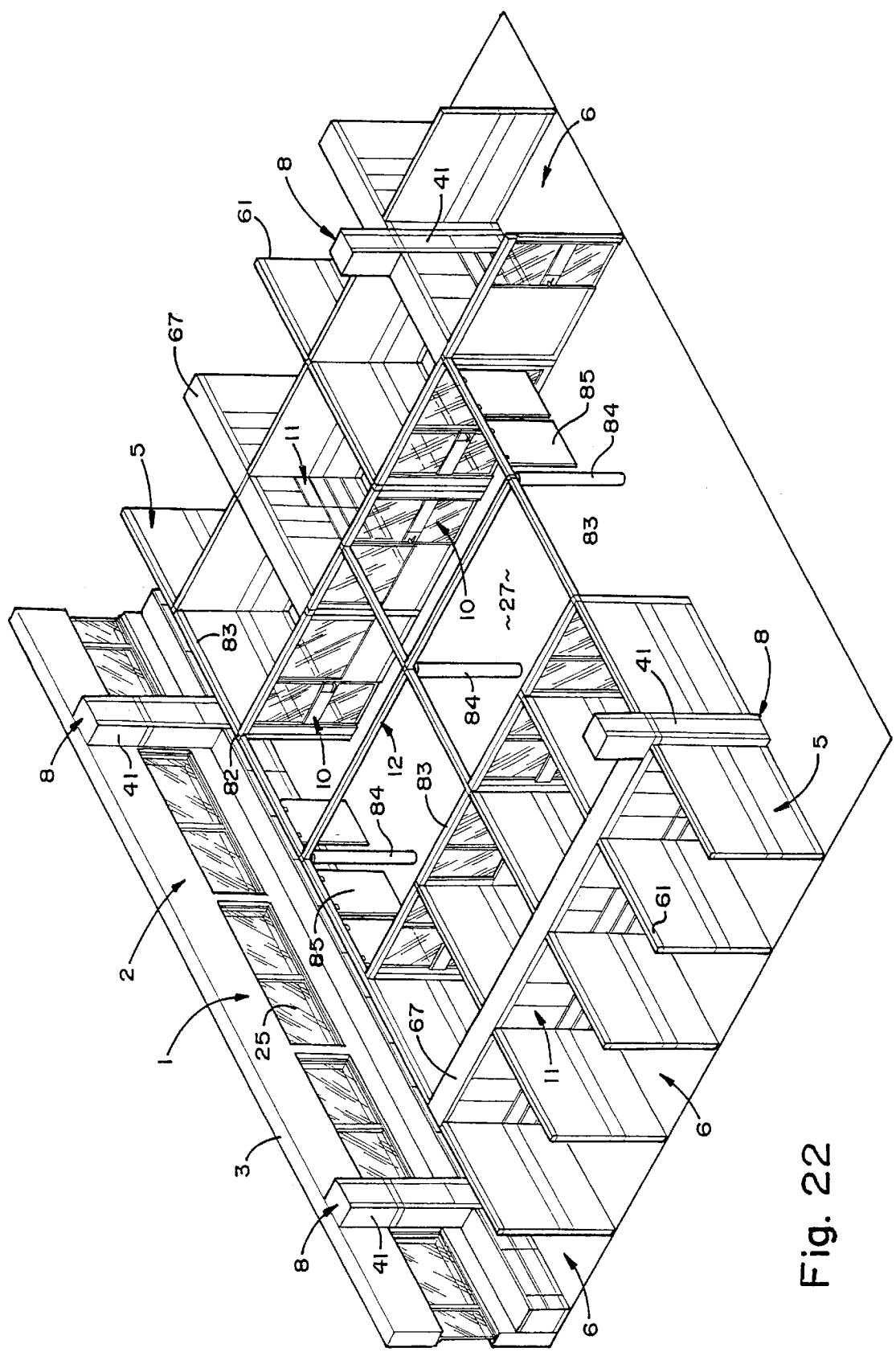
FIG. 22 is a perspective view of another configuration of the present invention, wherein the space frame system is positioned intermediate two groups of workstations or work settings.

FIG. 22 illustrates another arrangement of furniture system 1, wherein the space frame system 12 extends between two sets of workstations 6. The two sets of workstations 6 both include expressway raceways 61 extending along the top edges of the partitioning members, and are located at a height common with the frame segments 83 of space frame framework 82 and the associated raceways 87. Consequently, the space frame framework 82 provides a canopy effect for the common area disposed between the two sets of workstations 6, and also forms conduit to route utilities, support accessories, and accept infill between the two sets of workstations 6.

Figure 23:
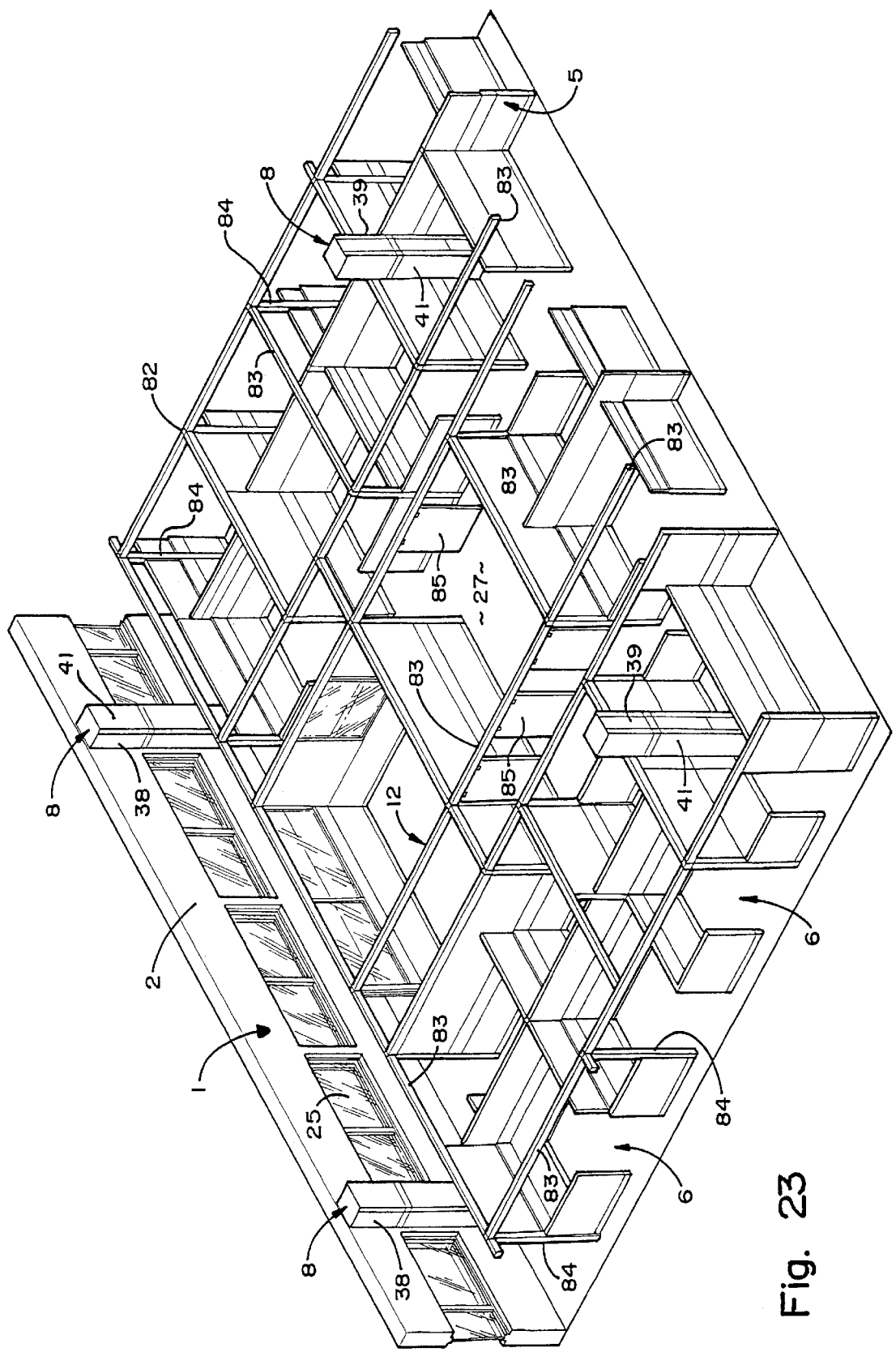
FIG. 23 is a perspective view of yet another configuration of the present invention, wherein the space frame system extends throughout the furniture system.
Figure 24:
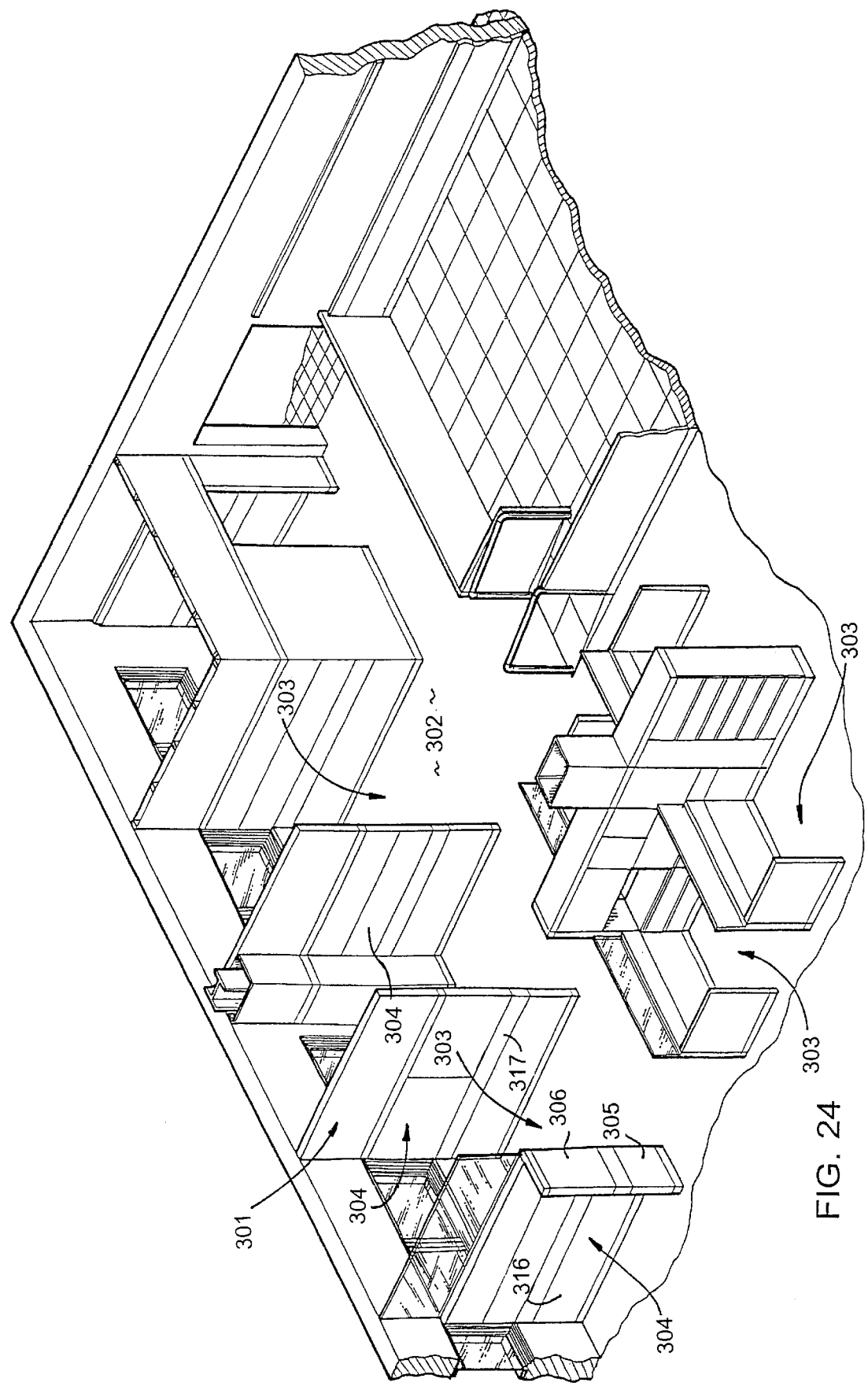
FIG. 24 is a perspective view of an integrated prefabricated furniture system similar to FIG. 17, which includes a freestanding partition panel and related system embodying the present invention.

FIG. 23 illustrates yet another arrangement of furniture system 1, wherein the space frame system 12 forms an overhead link for of each the workstations 6. Utilities can be routed through the raceways 87 in the frame segments 83 of space frame system 12 to provide suitable utilities to the various workstations 6.

Furniture system 1 is an integrated and comprehensive system of space definition and utility distribution products. It spans in function from present modular panel systems to current GWB walls, and surpasses both in terms of utility distribution, level of finish, flexibility, and integration. Furniture system 1 can provide a complete fit-out from the base building shell to the end user including utilities, finishes, and controls. Furniture system 1 also works within existing or more traditional new construction to provide the level of performance and enclosure required by specific buildings, organizations, and users. Furniture system 1 provides a full range of enclosure and privacy options from screens that wrap around desks, to partial height walls, to completely enclosed private spaces, and completely open post and beam frameworks for collaborative work. It fills all the functions traditionally provided by panels and GWB, while offering more flexibility, more accessories, and greater utility access. Furniture system 1 is based on a horizontal division of walls into zones which allow performance criteria to be added where they will be used with the greatest comfort and efficiency. For example, in the furniture system 1, the utilities are easily accessible and finishes can be varied at different heights. (For example, tack board or white board can be used in upper levels with more durable finishes used below). The horizontal aesthetic also recalls a traditional architectural vocabulary of wainscots, chair rails, and moldings that relates to the proportions of the human body. In furniture system 1, utilities are distributed in three horizontal zones, such as the kickway at the base, the beltway just above worksurface height, and the expressway located just above door height. These provide a variety of utility strategies depending on the height of the installation and the utility requirements. For additional loads, there are optional add-on utility troughs which can be mounted on partial height walls. For areas with low reconfiguration considerations, the interior of the wall can be accessed by removing the skins to provide large amounts of wiring capacity. The transoms can also carry large amounts of wires and some HVAC, and are ideally located for long distance distribution. Furniture system 1 is designed to maximize flexibility by providing access to wires for easy rewiring, by the skins being removable and interchangeable, by accessories being used across all the product lines, and by the stacking frame being reconfigured with a minimum of wastage. The various cover panels can be removed and replaced in the field giving added access to the interior wall for connections and allowing refurbishment of the system without any effect on the frames or utilities. The link-head system 14 provides access to building utilities to allow clean changes and minimize downtime. This flexibility is important to respond to the increasing frequency of change in the workplace.

FREESTANDING PORTABLE PARTITION SYSTEM DETAILS

The "Zone wall" portable partition system 5 is shown in greater detail in FIGS. 24–42 and, for convenience, the partition system is labeled as number 301 in FIGS. 24–42. It is noted that, as mentioned above in the second paragraph of the Detailed Description, the three wall systems 4, 5, and 7 (shown in FIGS. 6, 2, and 7, respectively) are completed and fully integrated in both function and appearance. Accordingly, it is to be understood that relevant structure of partition 301 that supports common function or appearance to the wall systems 4 and/or 7, can be integrated into or incorporated into the wall systems 4 and 7.

Figure 25:
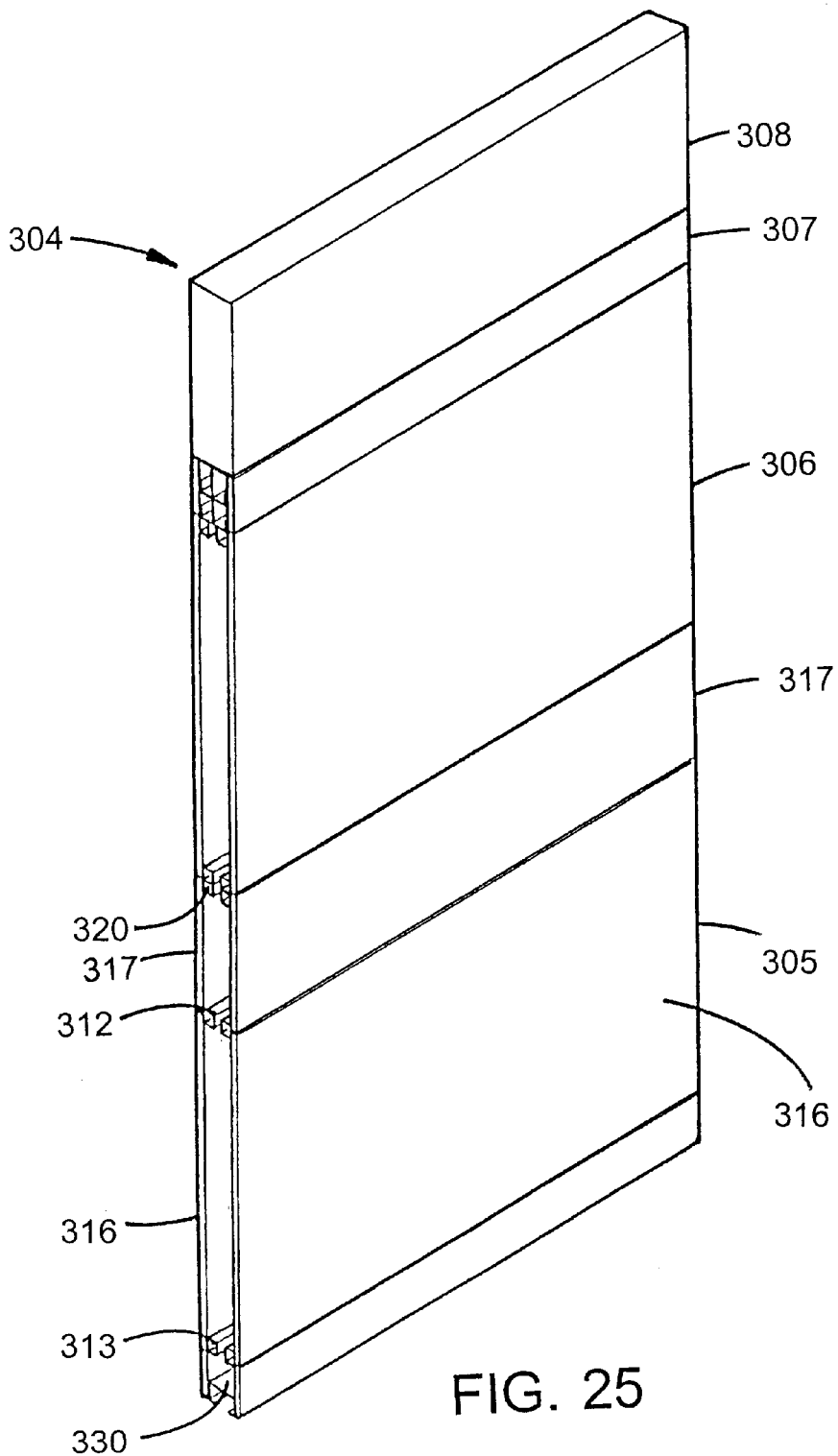
FIG. 25 is a perspective view of the freestanding partition panel shown in FIG. 24 embodying the present invention.
Figure 26:
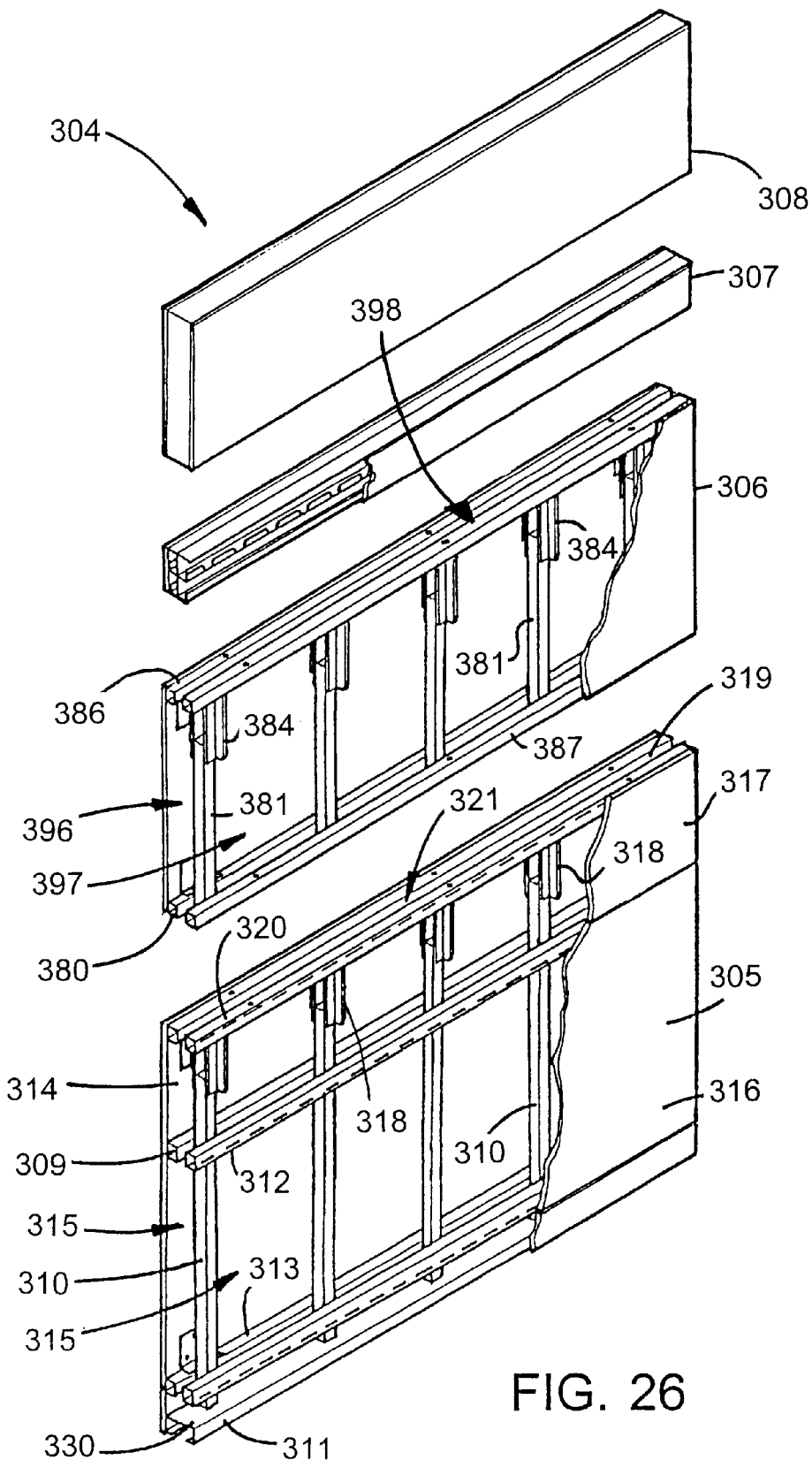
FIG. 26 is an exploded, perspective view of the partition panel shown in FIG. 25 wherein portions thereof have been broken away to reveal internal construction.
Figure 31:
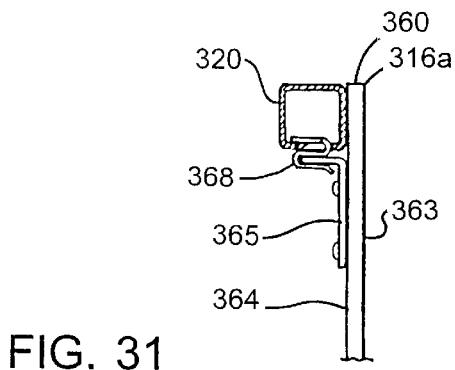
FIG. 31 is a fragmentary, vertical cross-sectional view of a cover panel of FIG. 27 shown mounted on the base panel frame.

The freestanding portable partition system 301 (FIG. 24) is designed for use in conjunction with open office spaces 302, and other similar environments to form a plurality of work settings or workstations 303. Partition system 301 includes a plurality of similar modular panels 304 (FIGS. 25 and 26), which are interconnected so as to define the desired workstations 303. One such partition panel 304 is illustrated in FIGS. 25 and 26, and includes a base panel 305, a stacker panel 306, expressway raceway 307, and a transom 308, which are stacked vertically on top of one another.

The base panel 305 (FIG. 26) includes a skeleton-like internal frame 309 having at least two vertical uprights 310 positioned adjacent opposite side edge thereof. A foot 311 extends downwardly from the bottom of frame 309 to abuttingly support base panel 305 on a floor surface. Two pairs of horizontal stringers 312 and 313 are attached to the outer faces of uprights 310 in a vertically spaced apart relationship to rigidly interconnect the same, and define therebetween two horizontal raceway cavities 314 and 315, which open to the opposite side faces of frame 309, and extend continuously between the opposite side edges thereof, such that when like base panels 305 are interconnected side-by-side, the open ends of adjacent raceway cavities 314 and 315 are aligned and communicate. Cover panels 316 enclose at least those portions of the frame side faces disposed between stringers 312 and 313, and are detachably mounted thereon to provide ready access to the raceway cavities 314 and 315, and permit lay-in wiring therealong.

Each of the illustrated vertical uprights 310 (FIGS. 32–34) include a pair of arms 318, which are attached to the outer faces thereof, and extend upwardly from upper ends thereof to define yoke-shaped receptacles 319 for receiving drop-in wiring therein. A third pair of horizontal stringers 320 is attached to the upper ends of arms 318, and extends generally parallel and coplanar with associated stringers 312 and 313. Each pair of stringers 312, 313, and 320 is spaced mutually laterally apart by the associated uprights 310, so as to define a vertical raceway cavity 321 positioned intermediate the two horizontal raceway cavities 314 and 315.

The illustrated base panel frame 309 (FIGS. 32–38) has an open, skeleton-like construction that is preferably provided in a variety of different widths to accommodate various applications. However, in each illustrated embodiment of base panel 305, the horizontal stringers 312, 313, and 320 are substantially longer than the vertical uprights 310, such that each base panel 305 has a horizontally elongated elevational shape or datum. The base panel frame 309 illustrated in FIG. 26 includes a total of five vertical uprights 310, each of which has a substantially identical, square tubular construction comprising opposite side faces 328 (FIGS. 32–38) oriented toward the opposite sides of base panel 305, and opposite end faces 329 oriented toward the opposite end edges of base panel 305. The lower ends of vertical uprights 310 are attached to a C-shaped base channel 330, which defines the panel foot 311, and includes a top web 331, and opposite side flanges 332. A pair of threaded glides or feet 333 extend through the web 331 of base channel 330 into the bottom ends of outermost uprights 310 to provide vertical adjustability at the opposite sides or ends of base panel 305. The illustrated arms 318 have a square tubular construction substantially identical to that of vertical uprights 310, and include opposite side faces 334, as well as opposite end faces 336. The lower ends 337 of arms 318 are fixedly attached to the side faces 328 of vertical uprights 310 adjacent the upper ends thereof, and extend vertically upwardly therefrom a distance of approximately two to four inches in vertical alignment with the associated upright 310, thereby defining the yoke-shaped receptacles 319 for drop-in wiring.

In the illustrated example of base panel frame 309, each of the horizontal stringers 312, 313, and 320 has a square tubular construction that is substantially identical with that of vertical uprights 310, and includes opposite faces 340–343 and opposite ends 344. Horizontal stringers 312, 313, and 320 have a length substantially identical with that of base panel 330, and are arranged in a mutually parallel, vertically spaced-apart relationship. In one working example of the present invention, stringers 313 are located approximately four inches above floor height, while stringers 312 are located approximately 30 inches above floor height. Horizontal stringers 312 and 313 have their inward faces 341 attached to the outer side faces 328 of vertical uprights 310 by means such as welding or the like. Stringers 320 have their bottom faces 343 rigidly attached to the upper ends 338 of arms 318, and in one working embodiment of the present invention, the same are positioned approximately 40 inches above floor height. Each pair of stringers 312, 313, and 320 is mutually horizontally aligned on opposite sides of its associated vertical upright 310. The stringers 312, 313, and 320 on the opposite sides of vertical uprights 310 are horizontally coplanar and facilitate the mounting of cover panel 316 and 317 thereon.

With reference to FIGS. 35–38, the illustrated horizontal stringers 312, 313, and 320 are slotted to permit like panels 304 to be interconnected and support various accessories thereon, as described in greater detail hereinafter. With reference to the upper stringers 320, the rear or inward face 341 is full as shown in FIG. 35, while the opposite front face 340 (FIG. 37) includes a series of horizontal slots 350, which extend continuously between opposite ends 344 thereof in a regular pattern. The bottom face 342 of horizontal stringers 312 includes an end slot 351 and a series of windows 352, as shown in FIG. 36, while the opposite top face 343 has an end slot 353 and stacker apertures 354, as shown in FIG. 38. In the base panel frame 309 shown in FIGS. 33 and 34, a pair of clamp brackets 356 are mounted to the opposite ends of each lower stringer 313 and project downwardly therefrom. Each clamp bracket 356 includes a semicircular notch 357 to receive an associated panel-to-panel clamp 358 (FIGS. 24b and 29a), as described below.

Figure 27:
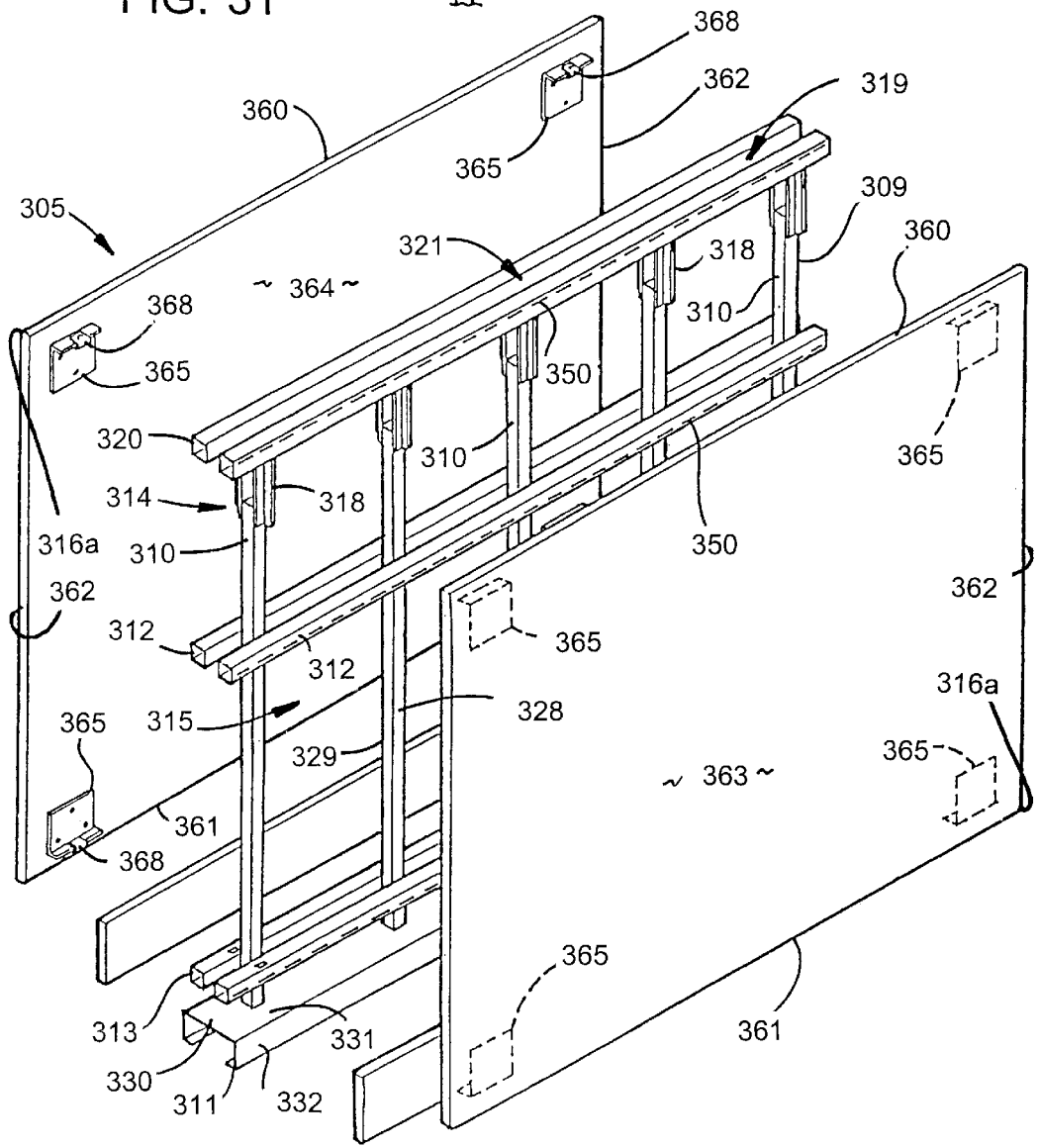
FIG. 27 is an exploded, perspective view of a base panel portion of the partition panel of FIG. 26, having a frame with removable cover panels.
Figures 32, 33:
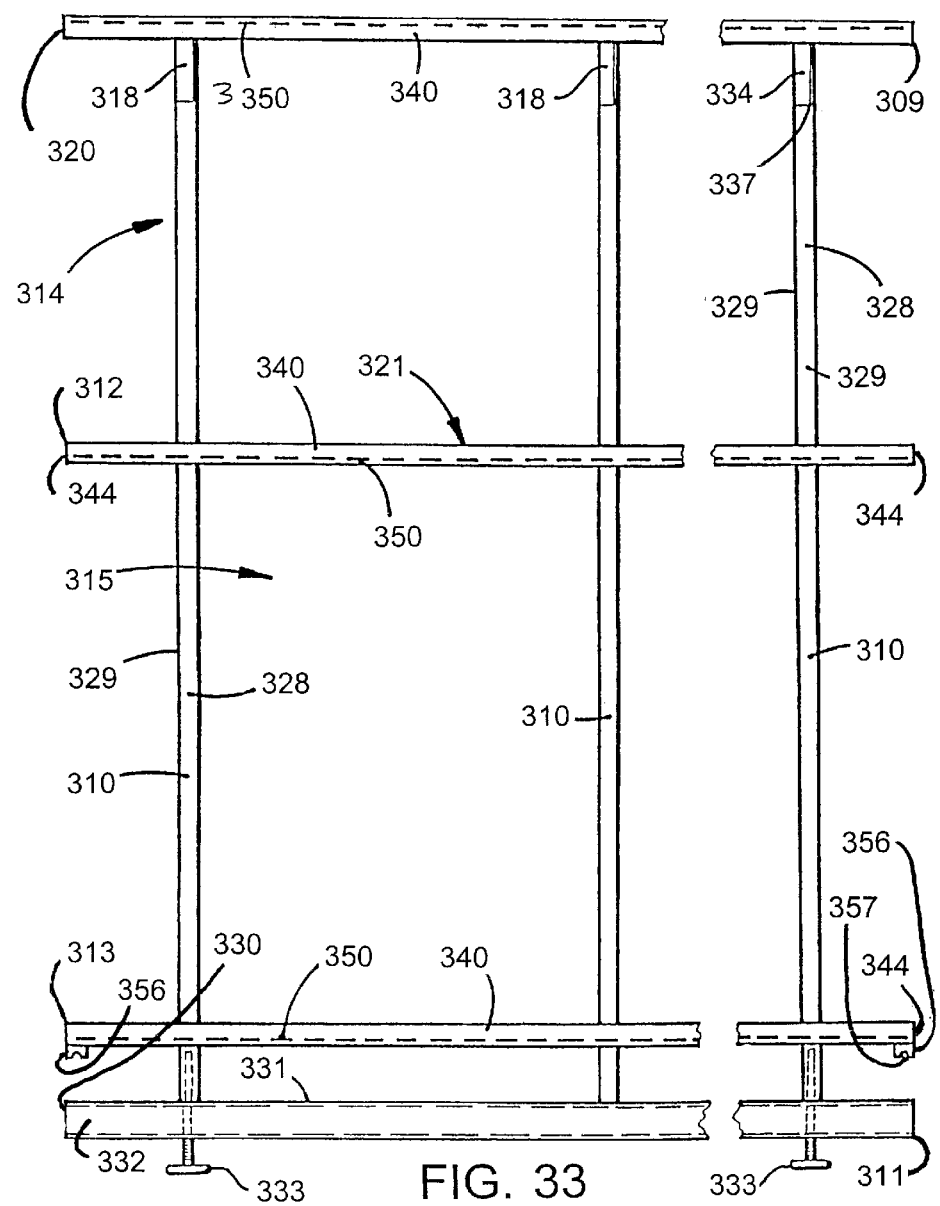
FIG. 32 is a fragmentary, top plan view of the base panel frame of FIG. 27.
FIG. 33 is a fragmentary, front elevational view of the base panel frame of FIG. 32.
Figure 41:
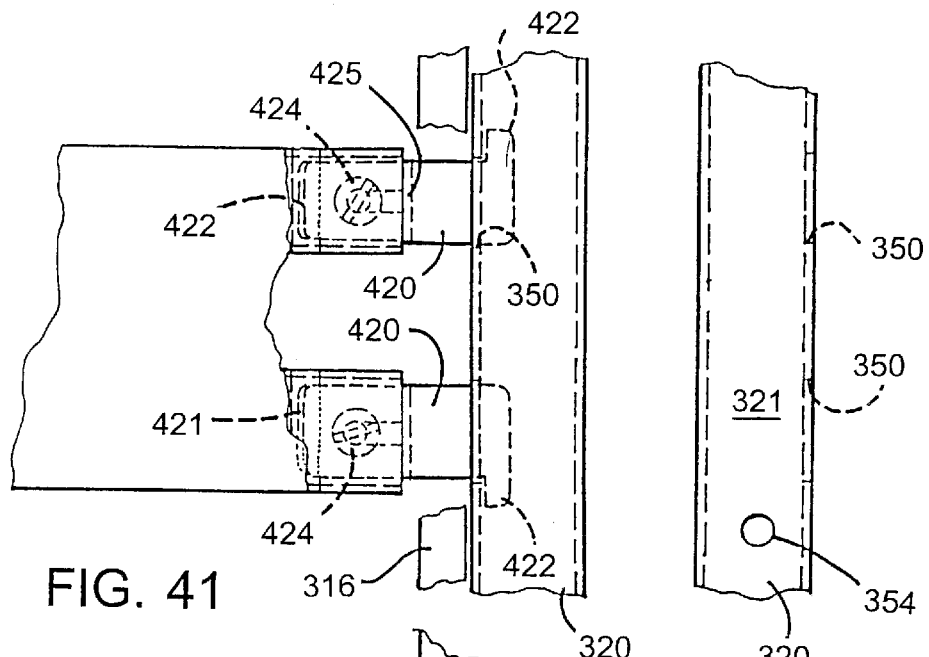
FIG. 41 is a fragmentary, top plan view of the panels shown in FIGS. 39 and 40 wherein portions thereof have been broken away to reveal internal construction.
Figure 42:
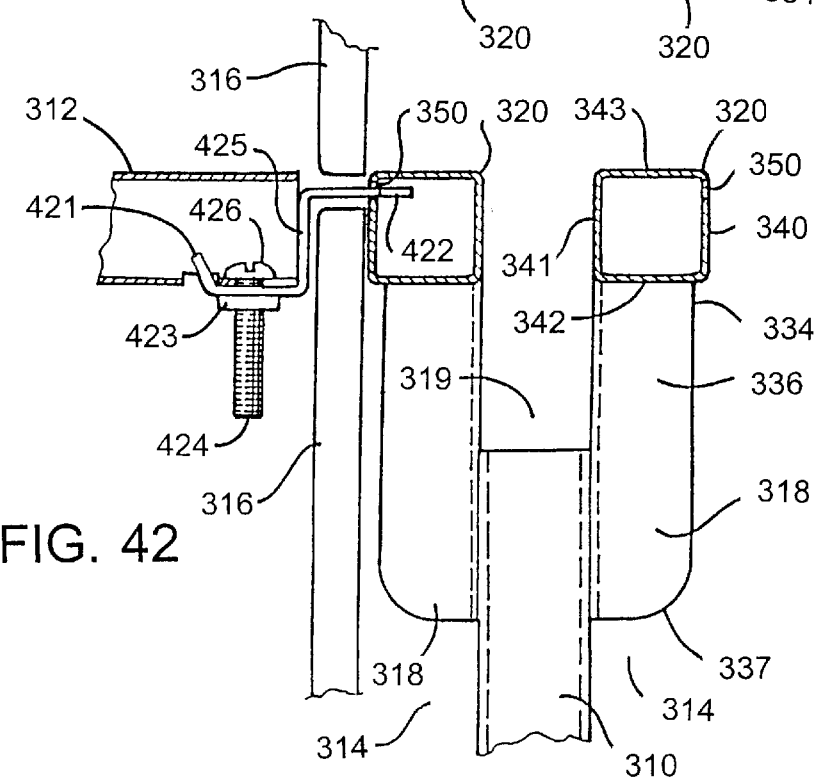
FIG. 42 is a fragmentary, vertical cross-sectional view of the panels shown FIG. 41.

The illustrated cover panels 316 and 317 (FIGS. 27–31) for base panel 305 have a substantially similar construction, each with a rectangular front elevational shape that includes a top edge 360, bottom edge 361, opposite side edges 362, and opposite faces 363 and 364. The front faces 363 of cover panels 316 and 317 are preferably finished, so as to provide and aesthetically pleasing appearance, and may include upholstery, paint, wood veneer, as well as specialty surfaces, such as white board, chalk board, and the like. Each cover panel 316 and 317 has a width generally commensurated with that of its associated panel frame 309, and a height generally commensurated with the vertical spacing between an associated pair of horizontal stringers 312, 313, and 320. For example, in the base panel 305 illustrated in FIG. 26, cover panel 316 extends between medial portions of stringers 312 and 313, while cover panel 317 extends between medial portions of stringers 312 and 320. A full height cover 316a is shown in FIG. 27, and extends between medial portions of stringers 313 and 320 to enclose the entire face of base panel frame 309. L-shaped brackets 365 are attached to the interior faces 364 of cover panel 316 and 317 adjacent opposite corners thereof by fasteners 366, or another suitable attachment system, such as adhesive, etc. Each of the brackets 365 has an outwardly extending flange 367, which receives a spring-type mounting clip 368 thereon. As shown in FIG. 30, each clip 368 has a generally S-shaped side elevational configuration comprising three parallel leg portions 369–371. The outer leg 369 and center leg 370 form a U-shaped area that snaps onto the flange 367 of bracket 365, as shown in FIGS. 28 and 29. The outer leg 371 includes a barb 373 that engages the window 352 on the associated stringers 312, 313, and 320. Cover panels 316 and 317 are pushed inwardly onto frames 309, so that clips 368 engage brackets 365 to detachably mount the cover panels in the fashion shown in FIG. 31.

In use, the cover panel 316, 317, and 317a are installed on an associated base frame 309 in the following fashion. The cover panels 316, 317, and 317a are first selected from a group of different widths and heights to match the panel configuration desired. The selected cover panels 316, 317, and 317a are then converged on to the opposite sides of the associated frame 319, with clips 368 engaging the aligned stringers 312, 313, and 320. Cover panels 316, 317, and 317a are then urged inwardly against the associated panel frame 309, so that the barb 373 on clips 368 engage aligned windows 352 in horizontal stringers 312, 313, and 320 to securely, yet removably mount the same in place. Cover panels 316, 317, and 317a are thereby positioned against or adjacent the outer faces 340 of horizontal stringers 312, 313, and 320, thereby enclosing or completing the horizontal raceway cavities 314 and 315, each of which has a vertically elongated shape when viewed in end elevation. The two horizontal raceway cavities 314 dispose between horizontal stringers 312 and 320 are located adjacent worksurface height and define beltway raceway cavities. The two horizontal raceway cavities 315 disposed between horizontal stringers 312 and 313 are located adjacent to the panel base and define lower raceway cavities.

With reference to FIGS. 39–42, partition panels 304 can also be interconnected in a branched or angular configuration in the following fashion. Branching clips 420 are provided and have a generally plate shaped construction, which includes a upturned tab 421 at one end and a horizontally oriented hook 422 at the opposite end. A threaded boss 423 is mounted on a lower portion of branching clip 420 and is aligned with a mating aperture in which a threaded fastener 424 is received. Branching clip 420 has a L-shaped center portion 425, which extends along the end 344 of an associated one of the stringers, such as the illustrated stringer 312.

In use, the partition panel 304 can be interconnected to a like partition panel 304 in an angular orientation at locations anywhere along the length of the in-line panels. For instance, in the example illustrated in FIGS. 39 and 40, three panels 304 are shown interconnected in an in-line orientation in the fashion described herein above. A single panel 304 is shown attached at a 90-degree angle to the three in-line panels at a position intermediate the opposite side edges of the center panel 304. It is to be understood that the branched panel 304 can be attached anywhere along the length of the three in-line panels, which greatly facilitates space planning.

A branched panel 304 is mounted in the following manner. A pair of branching clips 420 are selected, and hook ends 422 are inserted into the adjacent slots 350 in stringers 312, 313, and 320 at the location at which the branched panel 304 is to be located. The heads 426 of fasteners 424 are positioned in the hollow interiors of stringers 312. The tab ends 421 of clips 420 are shifted into the lower windows 355 in stringers 312, and fasteners 424 are then tightened to securely interconnect the branched panel 304. Notably, it is contemplated that other brackets can also be constructed to interconnect the wall systems 4, 5, and 7 (FIGS. 6, 2, and 7, respectively) together, such as for attaching ends of the wall systems 5 and 7 to horizontally extending frame members 49 of the wall-covering wall system 4 (FIG. 6), horizontally extending frame member 56 of floor-to-ceiling wall system 7 (FIG. 7), and horizontally extending frame member 70a, and 312 and 320 of freestanding portable partition system 5 (FIG. 17) and 304 (FIG. 25).

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A furniture system for subdividing a building space defined by existing building walls, such as drywall covered building walls, and for facilitating routing of utilities throughout the building space, comprising:

a wall-covering system including a framework of horizontally extending mounting channels with a first side adapted to stably engage the existing building walls and constructed to be secured thereto, and a second side configured to support first cover panels, and further including a plurality of the first cover panels releasably attached to the second side for covering the framework and for at least partially covering the existing building wall, the framework forming at least one horizontally extending first raceway with the first cover panels on the existing building wall so that utilities can be flexibly routed in the wall-covering system across the existing building wall; and a freestanding partition system including partition panels with preassembled partition frames arranged and interconnected to subdivide the building space into office areas and including second cover panels releasably attached to opposing side faces of the partition frames for covering both side faces of the partition frames, the partition frames being characteristically internally open so that utilities can be flexibly routed along and within the partition frames under the second cover panels, the partition system including at least one partition panel with an end abutting the wall-covering system and the partition frames having open ends that are configured so that the utilities can be easily routed from the wall-covering system to the freestanding partition system through the abutting end of the freestanding partition system.

2. The furniture system defined in claim 1, wherein the mounting channels include at least one hanger channel, the at least one partition panel being attached to the hanger channel.

3. The furniture system defined in claim 2, including the existing building walls, and wherein the mounting channels are characteristically secured to and carried by the existing building walls to which the mounting channels are attached.

4. The furniture system defined in claim 3, wherein the partition panels are partial height and characteristically do not extend to a building ceiling.

5. The furniture system defined in claim 4, wherein the mounting channels define a first raceway, the first belt-high raceway being one of the first raceways on the wall-covering system.

6. The furniture system defined in claim 5, wherein the preassembled partition frames define at least one second raceway that is at a belt-high height and aligned with the first belt-high raceway on the wall-covering system.

7. The furniture system defined in claim 6, wherein the framework of the wall-covering system and the preassembled partition frames include horizontally aligned frame members.

8. The furniture system defined in claim 7, wherein at least one of the mounting channels on the framework of the wall-covering system forms a trough for receiving horizontal lay-in wiring.

9. The furniture system defined in claim 7, including a removable column cover system for selectively covering support columns in the associated building room, including:

a plurality of internal frames, each having an openable side for positioning the same generally concentrically about an associated one of the support columns, at least some of which define vertical raceways to route utilities therethrough; and a plurality of cover panels detachably attached to opposite sides of said column cover frames to enclose the same.

10. The furniture system defined in claim 9, wherein at least some of said column cover frames include a belt zone utility trough positioned at a belt-high height.

11. The furniture system defined in claim 7, including a plurality of pre-assembled freestanding storage cases adapted to be positioned side-by-side to create a partition compatible with said wall-covering system and said portable partition system.

12. The furniture system defined in claim 7, including a plurality of pre-assembled facades, each having an entryway therein, and adapted for connection with said wall-covering system, and said portable partition system.

13. The furniture system defined in claim 7, including an overhead link head system for routing utilities throughout the building room, comprising a plurality of link head segments, each being supported from a ceiling portion of the building room, and mutually interconnected end-to-end to define a continuous housing through which utilities are routed.

14. The furniture system defined in claim 7, including a space frame system to support group work activities in an open portion of the open plan interior of the associated building room, including:

an overhead framework comprising a plurality of frame segments interconnected in an end-to-end fashion to form a rigid structure configured to be positioned above a floor surface;

a plurality of overhead support columns, each having an upper portion thereof connected with said overhead framework, and a lower portion thereof shaped to abut the floor surface and thereby support said overhead framework thereon in a freestanding fashion within the building room at a predetermined elevation;

a plurality of individual panels constructed to permit easy, manual, bodily translation of the same by an adult user, and including connectors detachably connecting the same with said overhead framework at various locations therealong in a manner in which said panels hand downwardly from said overhead support in a generally vertical orientation, and are readily and easily manually removable therefrom and reconfigurable thereon by the user.

15. The furniture system defined in claim 7, including a prefabricated floor construction adapted to be abuttingly supported on a floor surface of the building room, and including a hollow interior portion thereof defining a floor-located raceway to route utility conduits therethrough and defining a raised floor surface shaped to support at least one of the work settings thereon.

16. The furniture system defined in claim 15, wherein said floor raceway communicates with the vertical raceways in said portable partition system.

17. The furniture system defined in claim 16, wherein at least some of said overhead support columns on said space frame system include vertical raceways extending therealong, and said floor raceway communicates with the vertical raceways in said overhead support columns.

18. The furniture system defined in claim 7, including an overhead link head system for routing utilities throughout the building room, comprising a plurality of link head segments, each being supported from an overhead structure portion of the building room, and mutually interconnected end-to-end to define a continuous housing through which utilities are routed and distributed.

19. The furniture system defined in claim 7, including a demountable movable wall system for forming custom width partitions compatible with said demountable architectural wall system and said portable partition system, comprising:

a plurality of vertical studs for positioning in a side-by-side relationship;

a plurality of beltway channels provided in different lengths to facilitate custom fabricating the partitions in different widths, wherein each is shaped to be attached to said studs adjacent the predetermined worksurface height to rigidly interconnect the same in a mutually parallel relationship, and permit continuous routing of utilities therethrough with said belt zone utility troughs on said demountable architectural wall system, and said utility raceways on said portable partition system; and a plurality of cover panels detachably attached to opposite sides of said studs to enclose the same.

20. The furniture system defined in claim 1, wherein the first and second cover panels have a horizontally elongated front elevational shape, and include upper cover panels having bottom edges and lower cover panels having upper edges spaced a short distance from the bottom edges, which creates a uniform horizontal appearance datum throughout the building room at a belt-high location on the existing building walls and within the building space.

21. The furniture system defined in claim 20, wherein at least some of the first and second cover panels are interchangeable.

22. The furniture system defined in claim 21, wherein the preassembled partition frames include first apertures for receiving clips on the first and second cover panels, thus supporting the interchangeability of the first and second cover panels.

23. The furniture system defined in claim 1, wherein the at least one horizontally extending first raceway includes at least two horizontally extending raceways defined by the mounting channels, and wherein the partition systems define at least two horizontally extending second raceways in the freestanding partition system that generally align with the at least two horizontally extending two first raceways.

24. A method of dividing a building space defined by existing building walls, such as drywall covered walls, and of facilitating routing of utilities throughout the building space, comprising steps of:

providing a wall-covering system including a framework of horizontally extending mounting channels with a first side adapted to stably engage the existing building walls and constructed to be secured thereto, and a second side for supporting first cover panels, and further including a plurality of the first cover panels releasably attached to the second side for covering the framework and for at least partially covering the existing building wall, the framework forming at least one horizontally extending first raceway with the first cover panels on the existing building wall so that utilities can be flexibly routed in the wall-covering system across the existing building wall;

providing a freestanding partition system including partition panels with partition frames arranged and interconnected to subdivide the building space into office areas and including second cover panels releasably attached to opposing side faces of the partition frames for covering both side faces of the partition frames, the partition frames being characteristically internally open so that the utilities can be flexibly routed along the partition frames under the second cover panels;

attaching the wall-covering system to the existing building wall by attaching the mounting channels to the existing building wall;

positioning the partition frames in a desired arrangement in the building space to define office areas, including positioning and securing one end of at least one partition panel abuttingly against the wall-covering system;

routing utilities throughout the building space and to the office areas by routing the utilities from the existing building wall into the framework and continuously along the framework and into the partition frames;

covering the framework with the first cover panels; and covering the partition frames with the second cover panels.

25. The method defined in claim 24, wherein the framework is attached to the existing building walls characteristically so that the framework is supported by the existing building walls.

26. The method defined in claim 25, wherein the partition frames include apertures, and wherein the first and second cover panels include clips for selectively engaging the apertures for retention to the freestanding partition system.

27. An integrated prefabricated furniture system for fitting-out building space of the type having a generally open plan interior defined by fixed walls, comprising:

a demounted architectural wall system for covering the fixed walls of an associated building room, including:

a plurality of horizontally extending mounting channels for attachment to the fixed walls along upper and lower portions thereof, some of the mounting channels being attached to the fixed walls at a position vertically in between the upper and lower portions thereof, adjacent a predetermined worksurface height, the mounting channels defining a worksurface high wireway;

a plurality of first cover panels, at least some of which are full width and have a horizontally elongated front elevational shape, and are detachably attached to said mounting channels to thereby cover the fixed walls;

a portable partition system for spatially dividing the open plan interior of the associated building room into a plurality of work settings, including:

a plurality of freestanding panels detachably interconnected side-by-side in a predetermined plan configuration and having:

internal frames, at least some of which define a horizontally extending utility raceway positioned adjacent the predetermined worksurface height; and a plurality of second cover panels, each having a horizontally elongated front elevational shape, and being detachably attached to the opposite sides of said frames to enclose the same;

at least some of said internal frames abutting said demountable architectural wall system so that wires and cabling can be routed from the demountable architectural wall system to the portable partition system; and wherein said first cover panels of said demountable architectural wall system and said second cover panels of said portable partition system, each having first and second belt-high cover panels that have a narrow but substantially equal width and are positioned at a common height to present a uniform horizontal appearance datum throughout the building room.

28. The furniture system defined in claim 27, including a space frame system to support group activities in an open portion of the open plan interior of the associated building room, including:

an overhead framework comprising a plurality of frame segments interconnected in an end-to-end fashion to form a rigid structure configured to be positioned above the floor surface;

a plurality of overhead support columns, each having an upper portion thereof connected with said overhead framework, and a lower portion thereof shaped to abut the floor surface and thereby support said overhead framework thereon in a freestanding fashion within the building room at a predetermined elevation;

a plurality of individual panels constructed to permit easy, manual, bodily translation of the same by an adult user, and including connectors detachably connecting same with said overhead framework at various locations therealong in a manner in which said panels hand downwardly from said overhead support in a generally vertical orientation, and are readily and easily manually removable therefrom and reconfigurable thereon by the user.

29. The furniture system defined in claim 28, including a plurality of pre-assembled facades, each having an entryway therein and adapted for connection with said demountable architectural wall system and said portable partition system.

30. The furniture system defined in claim 28, including an overhead link head system for routing utilities throughout the building room, comprising a plurality of link head segments, each being supported from a ceiling portion of the building room, and mutually interconnected end-to-end to define a continuous housing through which utilities are routed.

31. A furniture system defined in claim 27, including a prefabricated floor construction adapted to be abuttingly supported on the floor surface of the building room, and including a hollow interior portion thereof defining a floor-located raceway to route utility conduits therethrough and a raised floor surface shaped to support at least one of the work settings thereon.

* * * * *